May 3, 1960 M. P. MATTHEW 2,935,171
REMOTE CONTROLLED TYPEWRITER
Original Filed Sept. 15, 1953 15 Sheets-Sheet 1
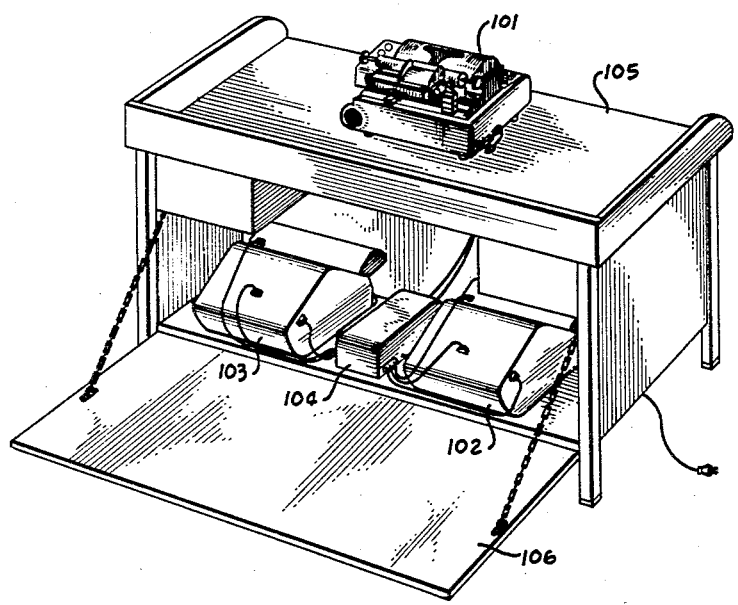
FIG_1
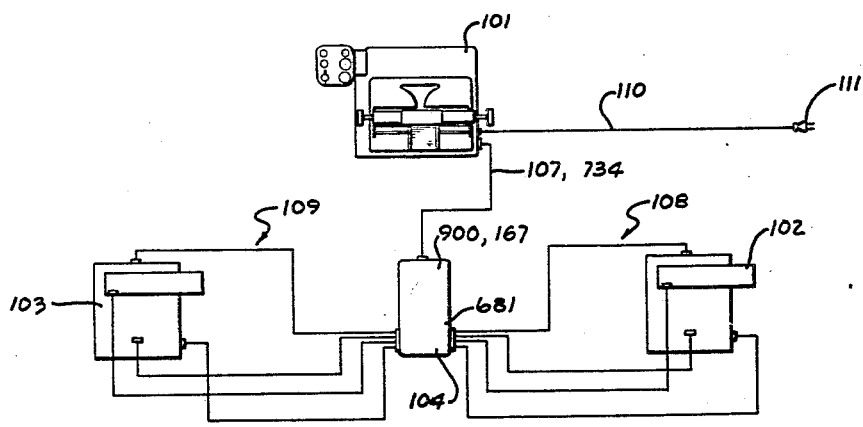
FIG_2

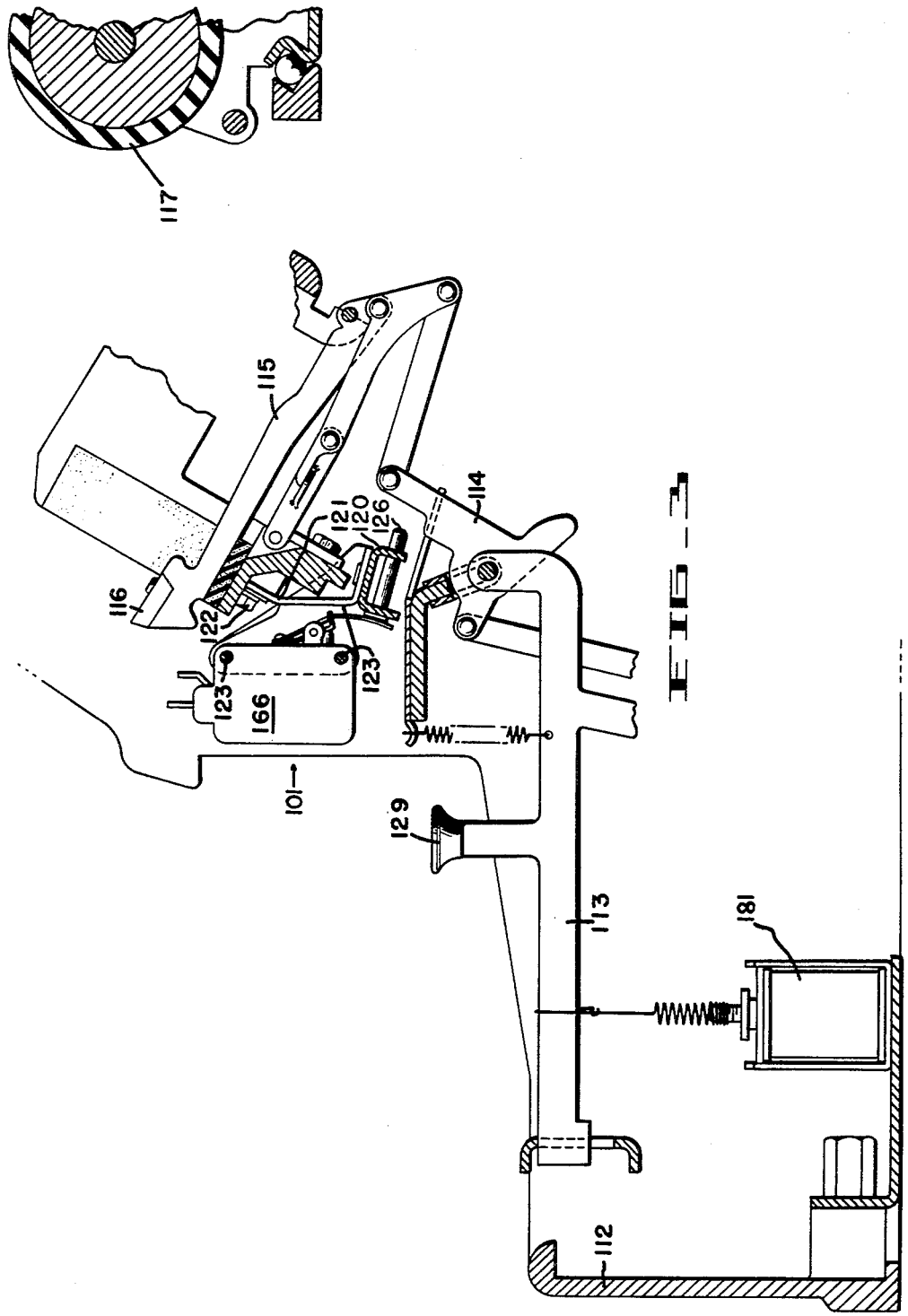

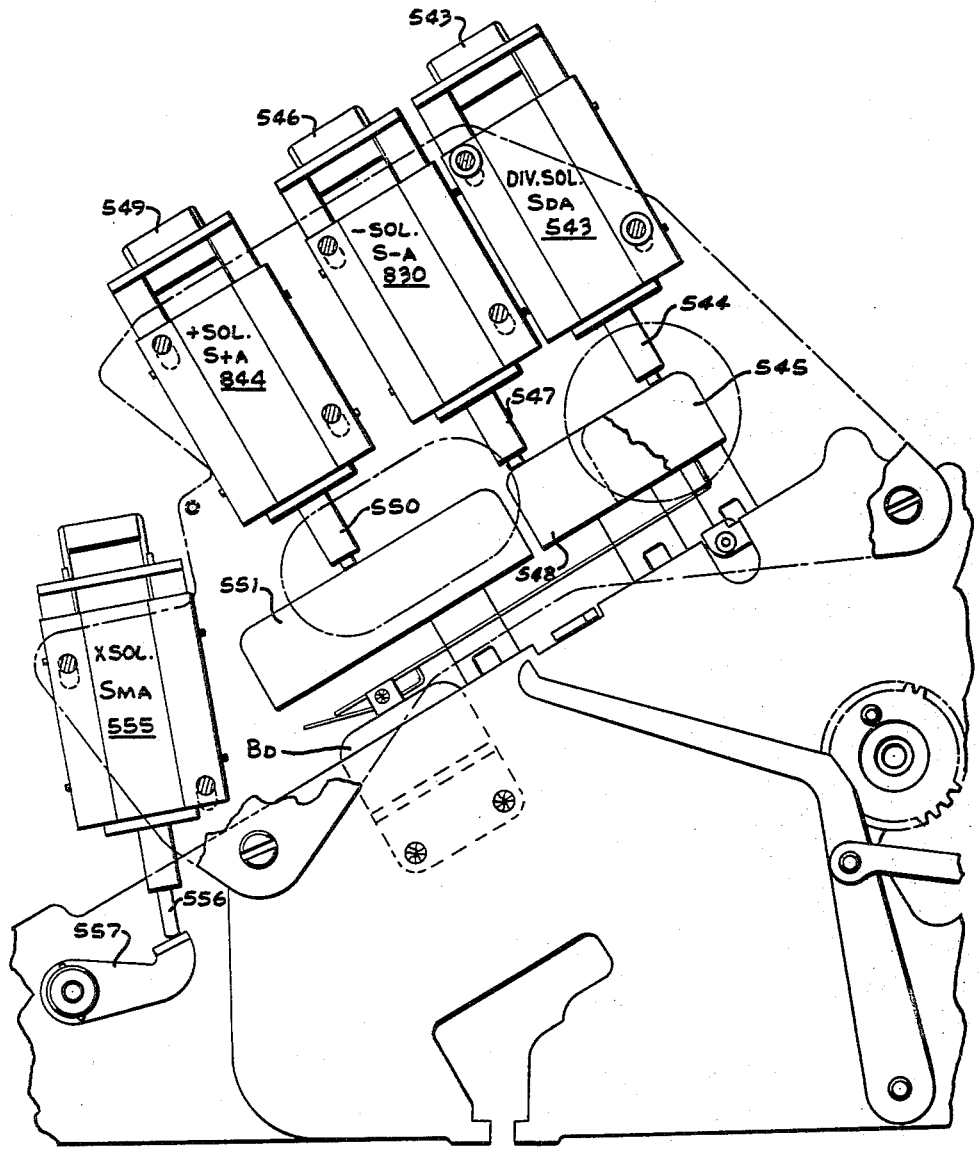

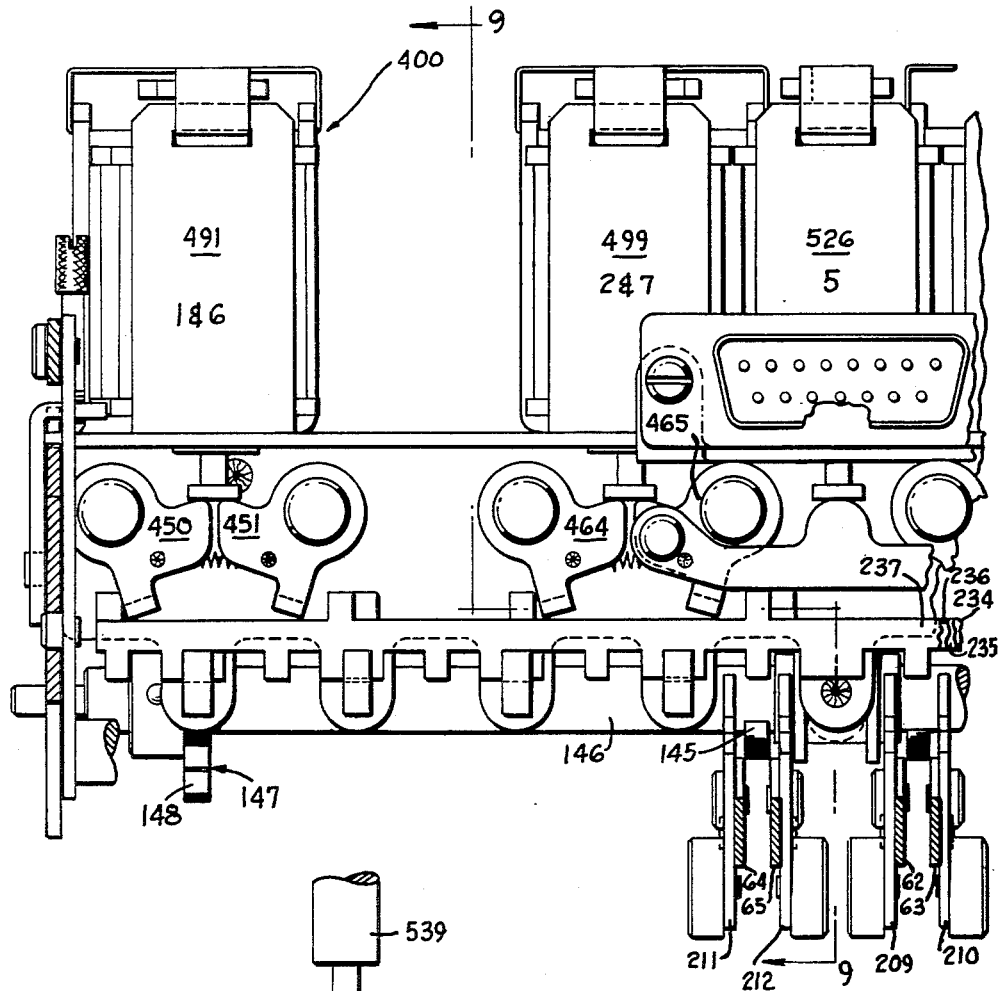
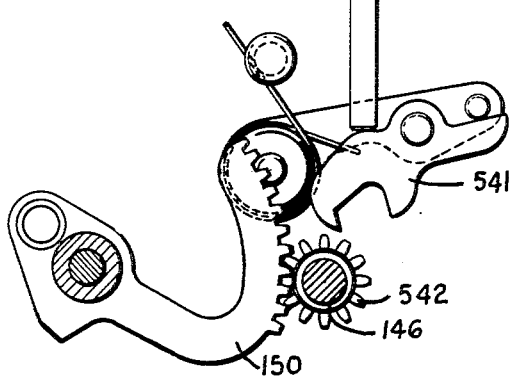

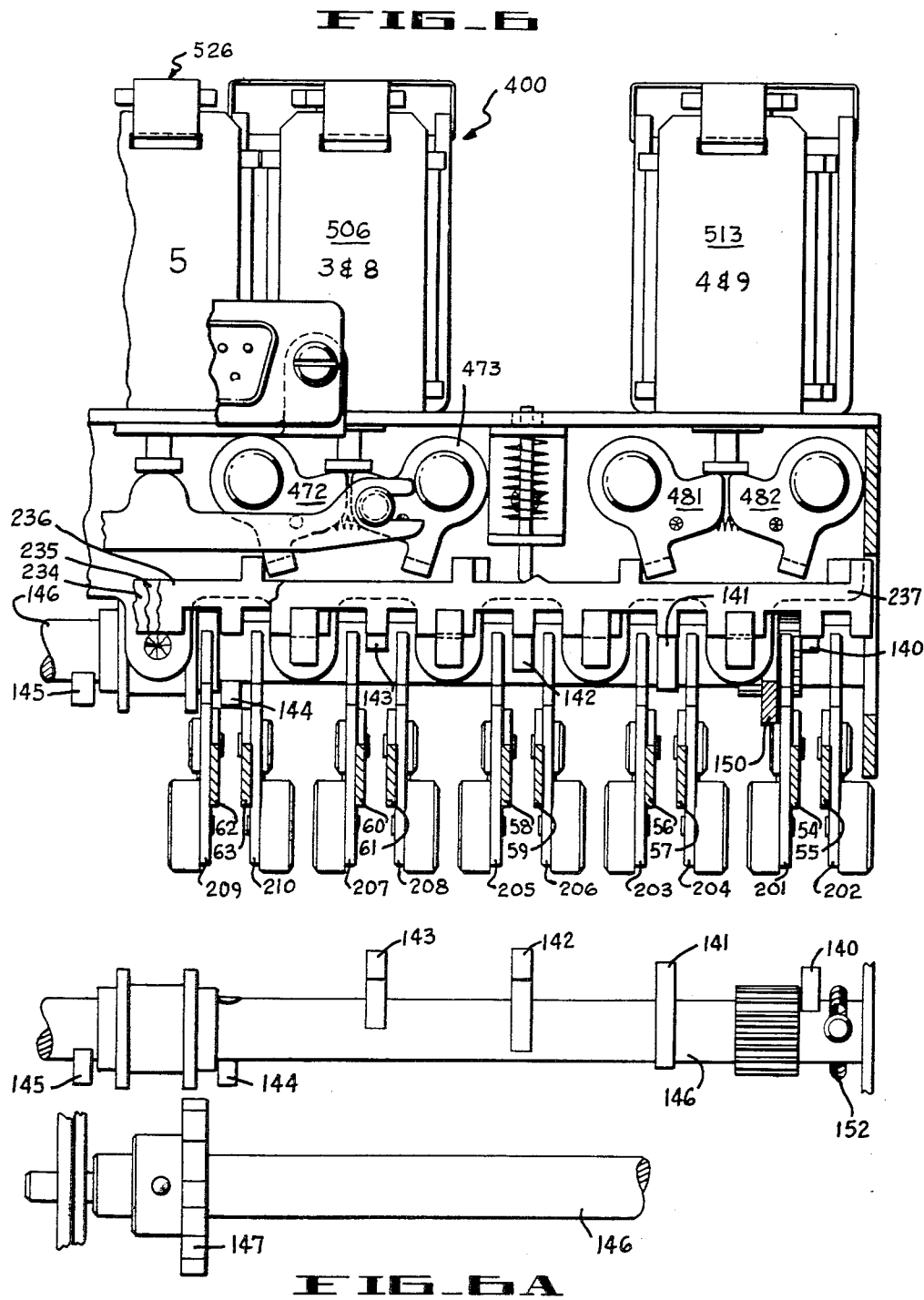

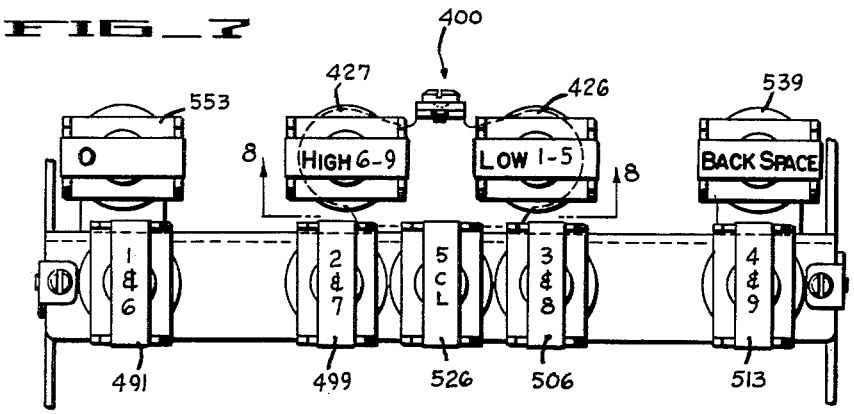
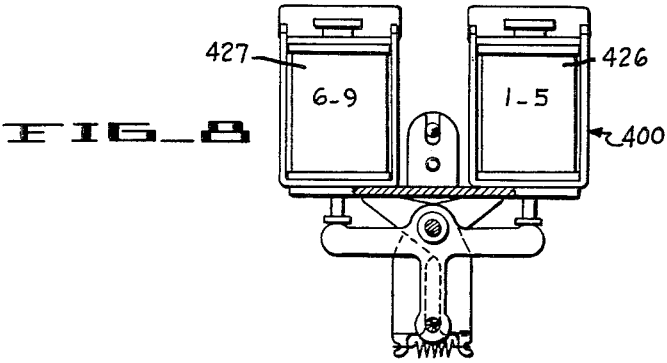

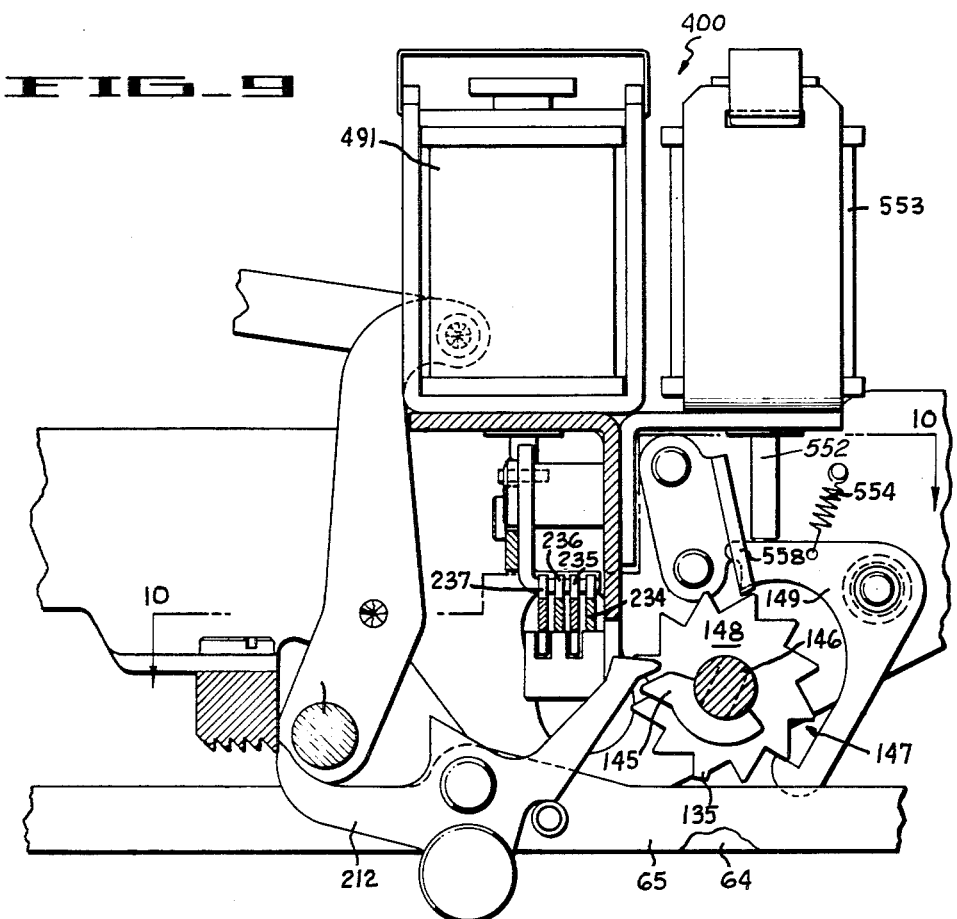
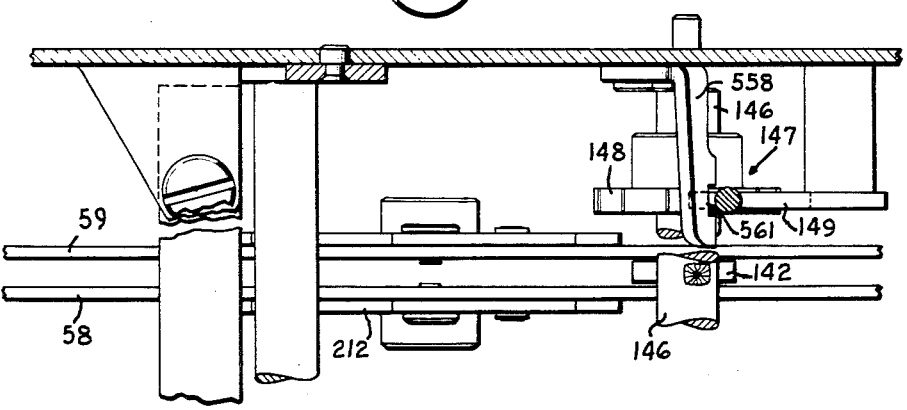

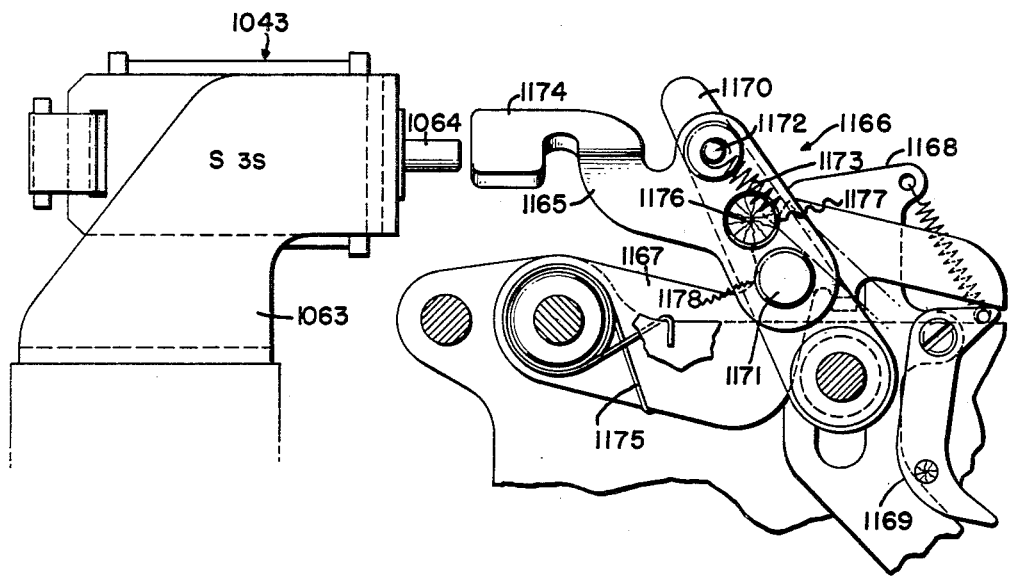
FIG_12
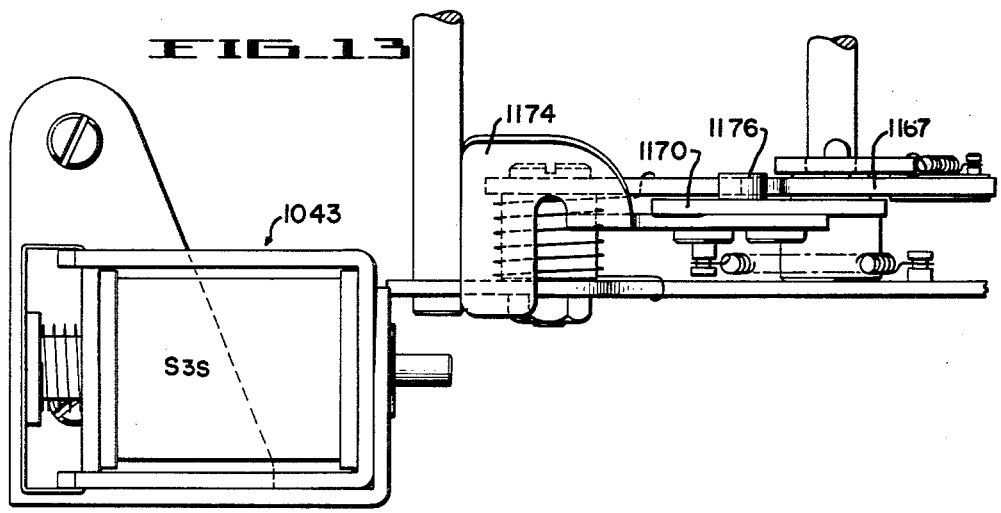
FIG_13

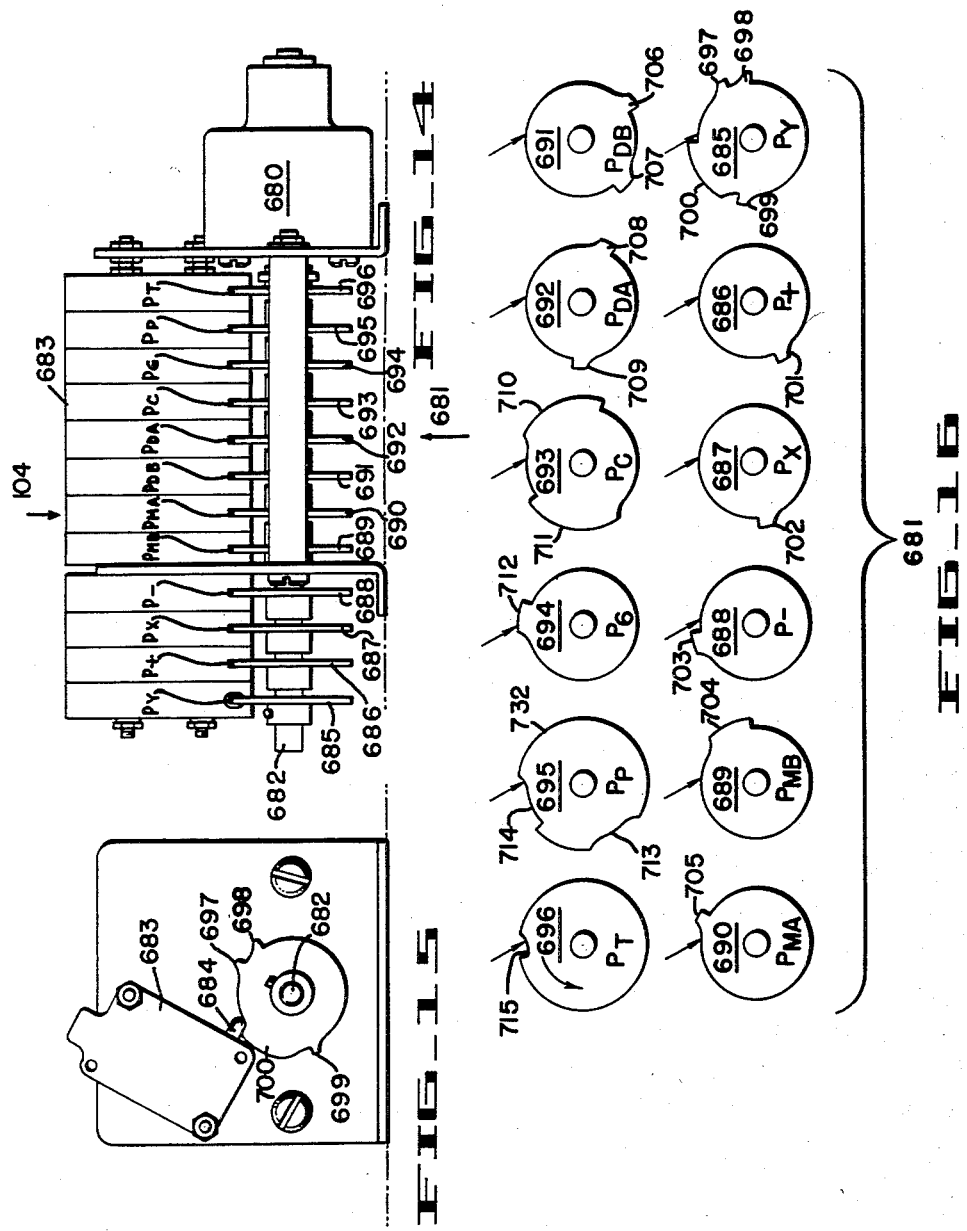

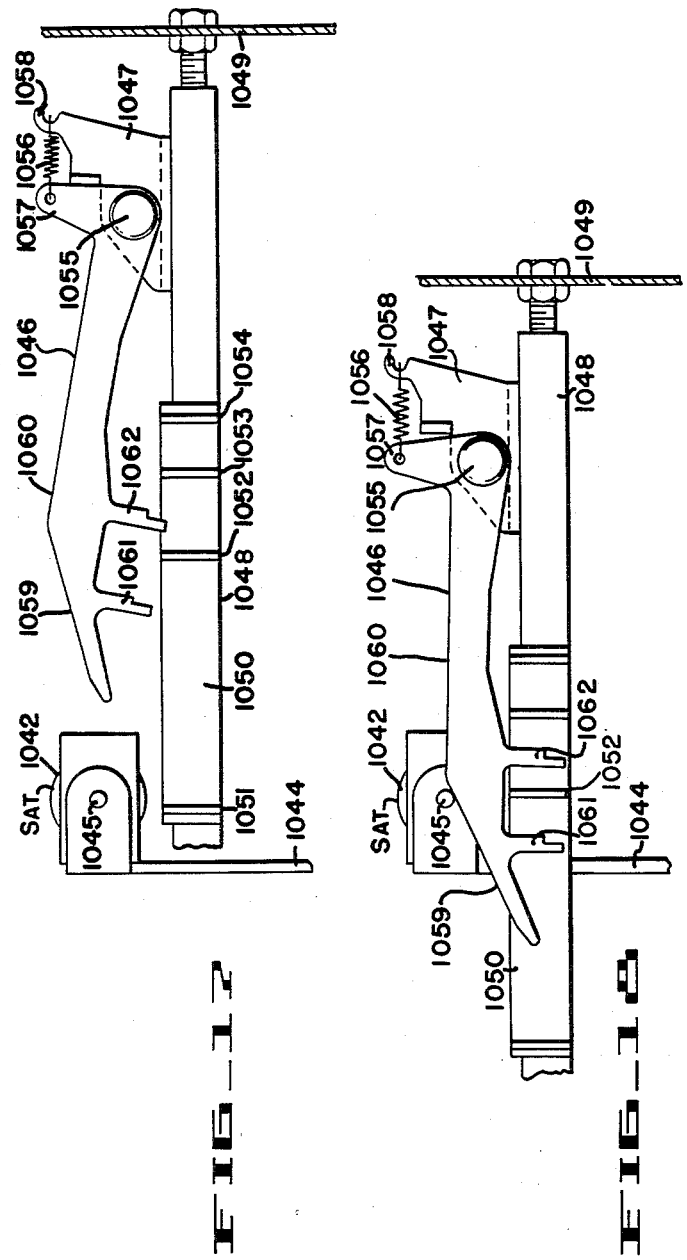

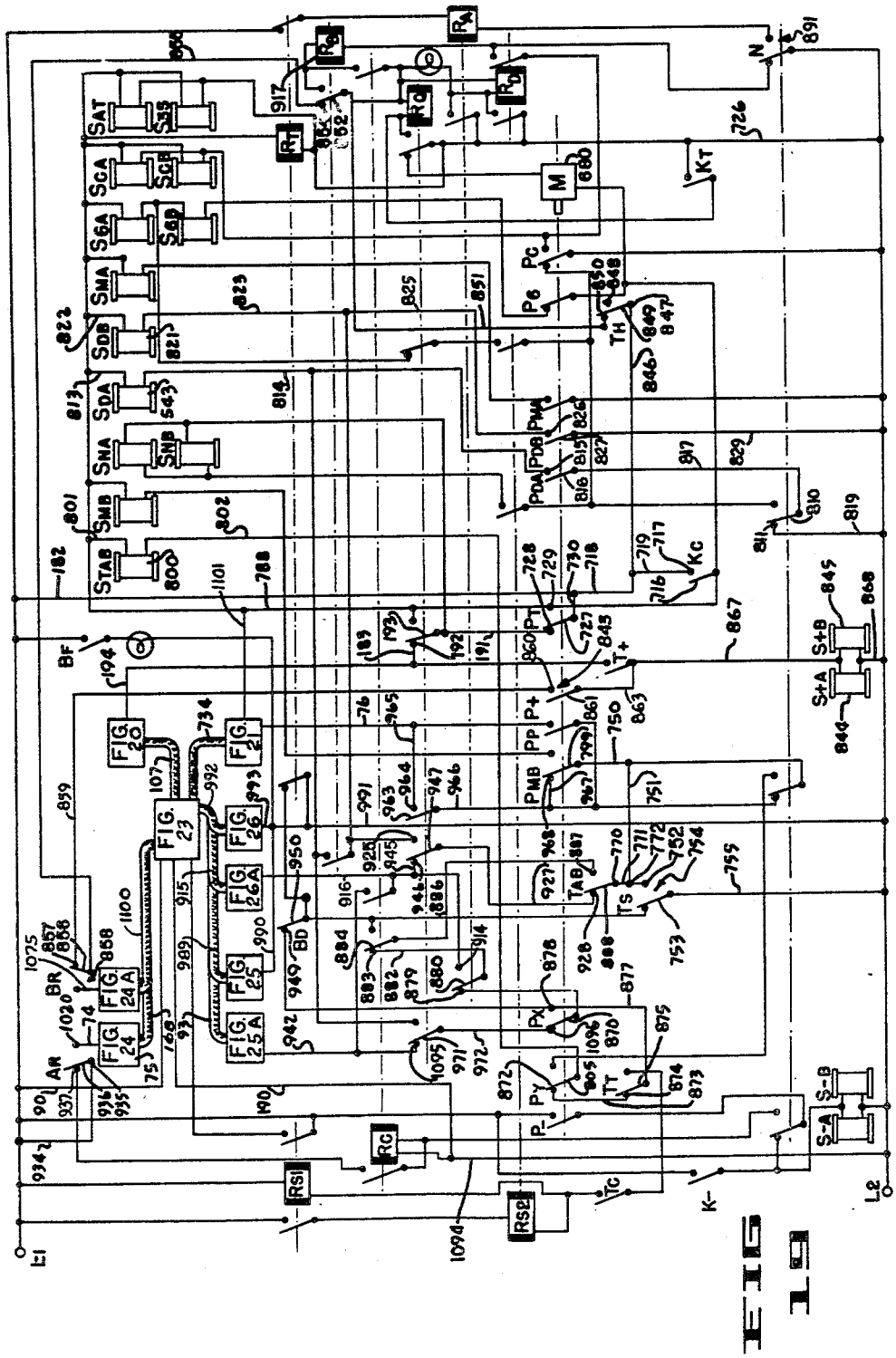

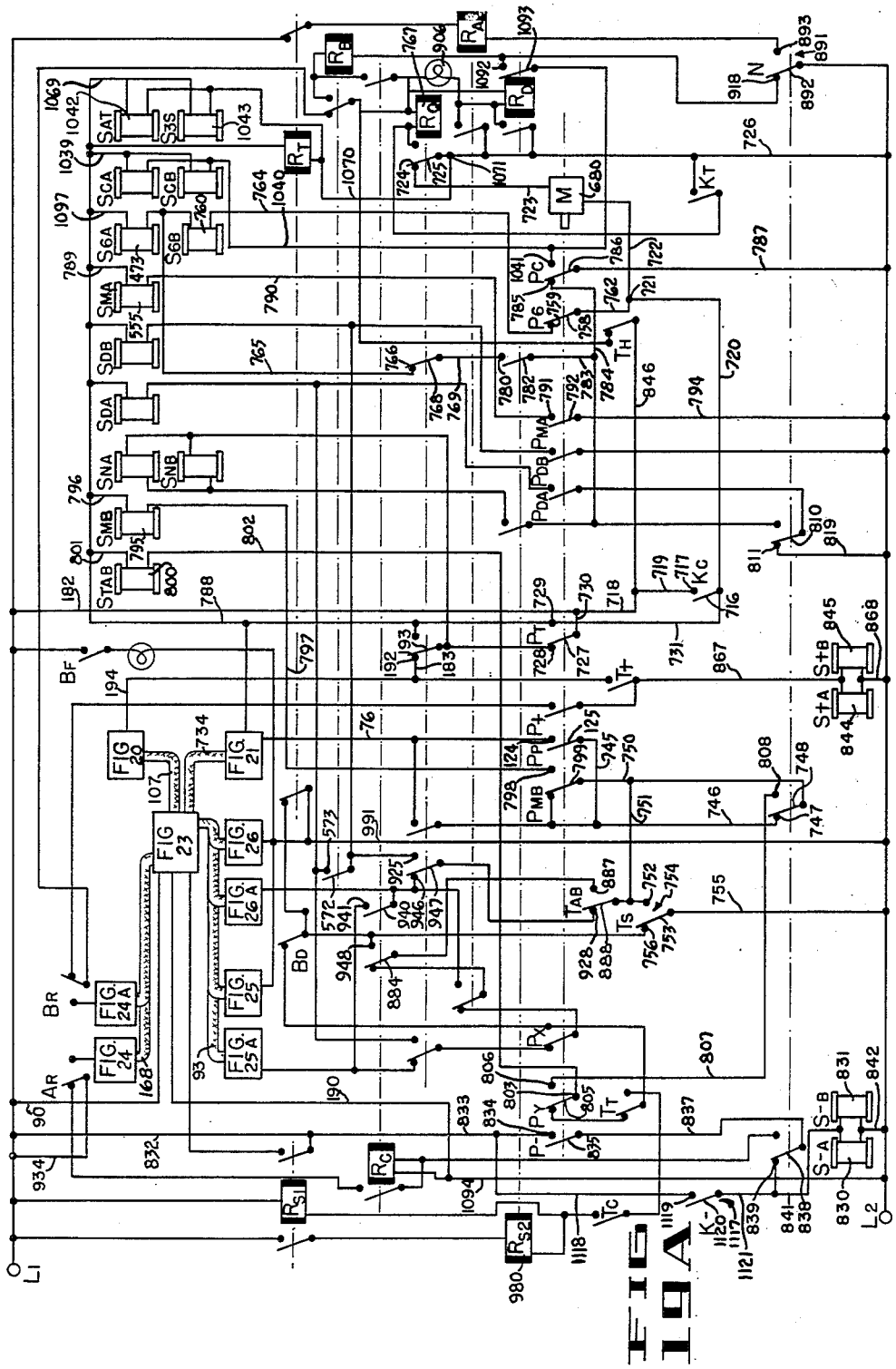

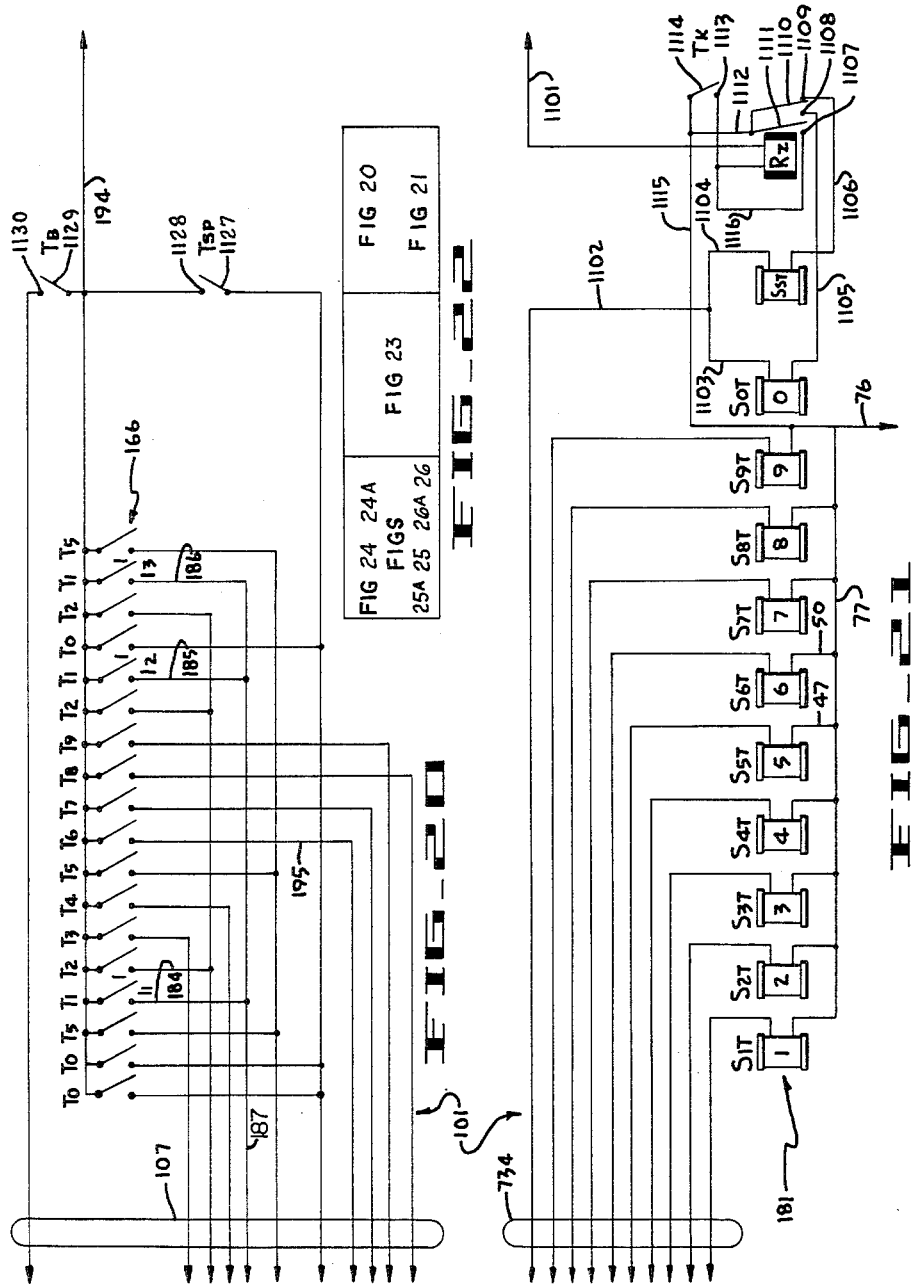

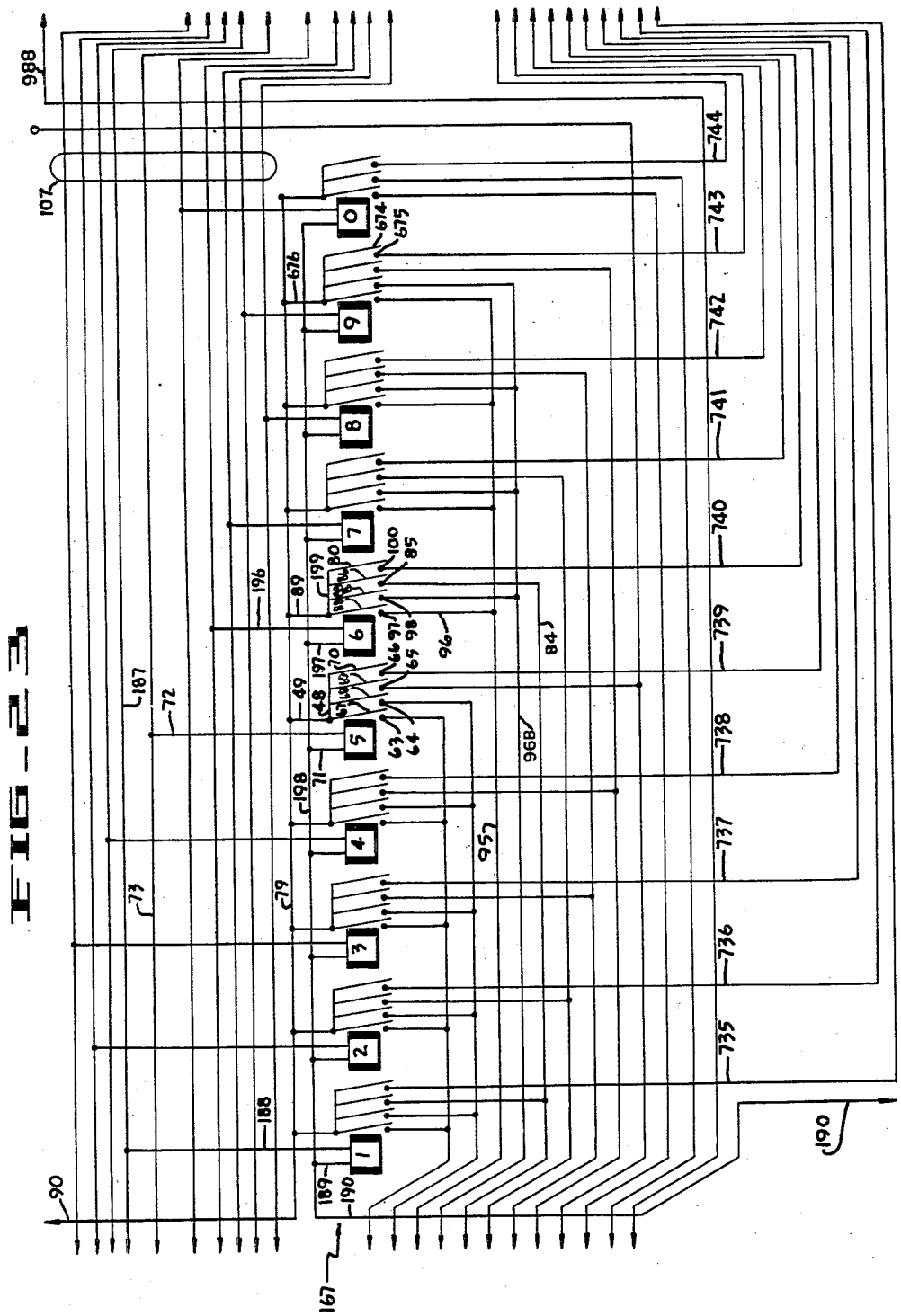

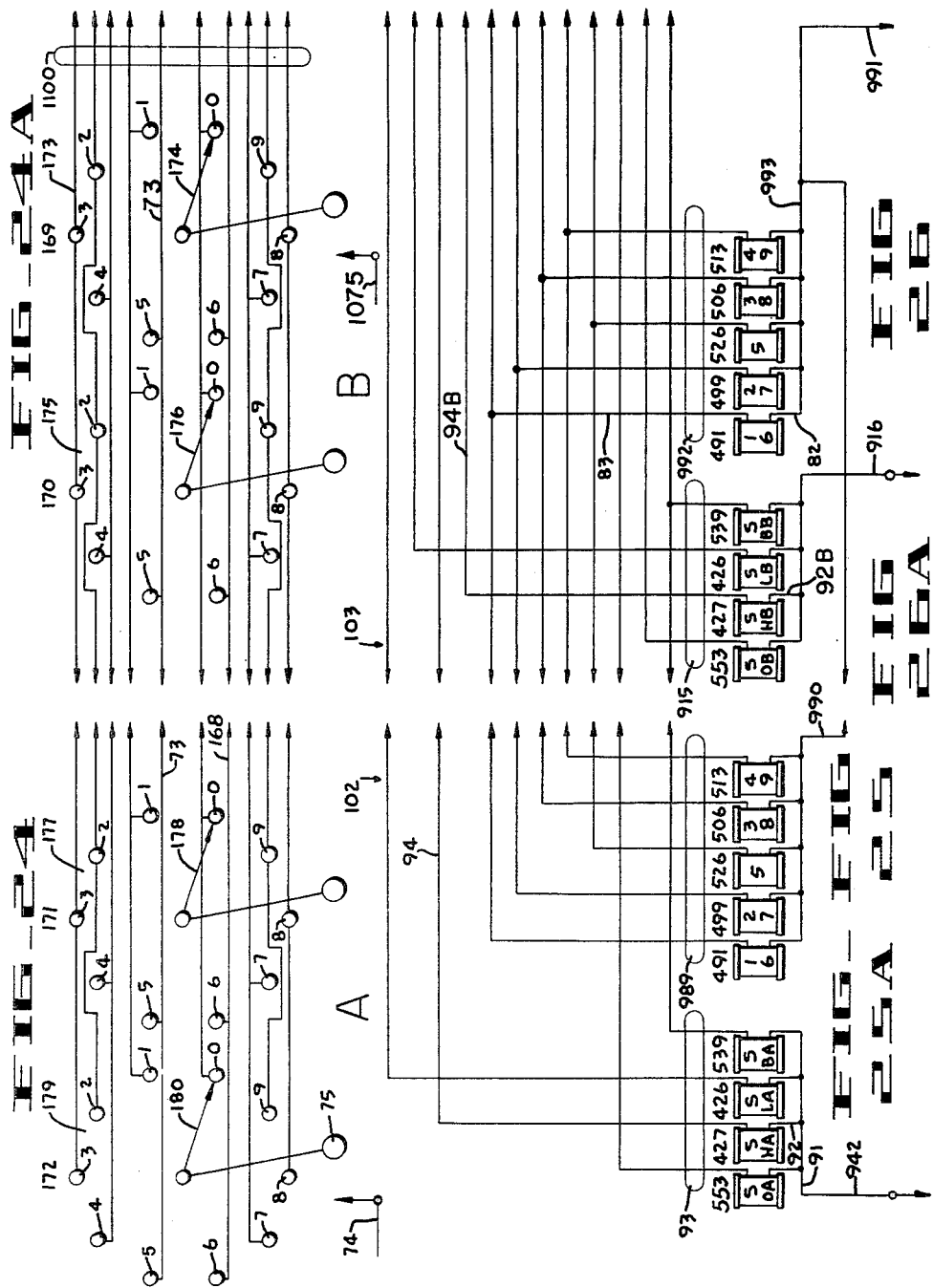

United States Patent Office 2,935,171
Patented May 3, 1960

2,935,171

REMOTE CONTROLLED TYPEWRITER

Morton P. Matthew, Silvermine, Conn., assignor to Friden, Inc., a corporation of California Original application September 15, 1953, Serial No. 380,241, now Patent No. 2,842,310, dated July 8, 1958. Divided and this application December 9, 1957, Serial No. 701,385

7 Claims. (Cl. 197—120)

This invention relates to calculating and recording apparatus, and more particularly to the control of the carriage mechanism of the recording apparatus, and is a division of Patent No. 2,842,310 issued July 8, 1958 and entitled "Typewriter Controlled Calculators."

An object of the invention is to provide the carriage of the recording apparatus with remotely controlled line spacing and tabulating mechanism.

Another object of the invention is the provision of an improved tabulating mechanism in the recording apparatus providing a plurality of electrically controlled tabulator stops.

Another object of the invention is to provide a plurality of tabulator stops controlled electrically to determine selective positioning of the carriage in the recording apparatus.

Another object of the invention is the provision of improved control means for a recording apparatus selectively operable to provide a predetermined number of tabulator stops for the carriage of a recording apparatus and to predetermine the degree of rotation of the platen in the carriage.

A further object of the invention is to provide the platen in the carriage of a recording apparatus with an electrically settable line spacing control mechanism.

Other objects and advantages of the invention will become apparent from the following description of a preferred embodiment as illustrated in the accompanying drawings in which:

Fig. 1 is a view in perspective of a complete assembly of the improved typewriter and calculator apparatus mounted in an improved office desk;

Fig. 2 is a schematic view of the apparatus shown in Fig. 1 and shows the arrangement of the typewriter, calculators and control unit which comprise the machine;

Fig. 3 is a side view, partly in section, of a portion of a typewriter modified in accordance with this invention and showing a switch operated by a typewriter type mechanism and also a typical solenoid which operates a typewriter numerical key;

Fig. 4 is a side view of a portion of a calculator showing solenoids mounted on the calculator and operable to operate push keys and another movable member of the calculator and operable to control various operations in the calculator;

Fig. 5 is an enlarged front elevational view of the left and left central portions of a selection solenoid unit involving a solenoid controlled system of gates and a stepping cam shaft for controlling the operation of the selecting slides of a calculator;

Fig. 6 is a complemental figure to Fig. 5 and shows the right and right central portions of the selection solenoid unit; some of the parts and portions thereof shown in the right-hand portion of Fig. 5 are shown again in the left-hand portion of Fig. 6;

Fig. 6A shows the stepping cam shaft shown in Figs. 5 and 6, the stepping cam shaft being broken at one point and shown in two parts merely for convenience in getting the illustration in the available space on the drawing;

Fig. 7 is a top plan view of the selection solenoid unit;

Fig. 8 is a front view of a portion of the upper central portion of the selection solenoid unit shown in Fig. 7 and taken on the line 8—8 of Fig. 7 in the direction of the arrows;

Fig. 9 is a side view, partly in section, of a portion of the calculator selection mechanism and selection solenoid unit including a solenoid controlled escapement for the stepping cam shaft employed in the selection unit of the calculator for controlling the setting of the selecting slides of the calculator, the view being taken on the planes substantially as indicated by lines 9—9 of Fig. 5;

Fig. 10 is a top view of a portion of the structure shown in Fig. 9 and with the solenoids removed, the view being taken on the line 10—10 in Fig. 9;

Fig. 11 shows a ratchet control for the stepping cam shaft operable to cause a back spacing movement of the parts and shows means for rotating the calculator selection stepping cam shaft in a direction opposite to the normal direction of escapement;

Fig. 12 is an enlarged view of a triple spacer mechanism provided in the typewriter and a solenoid control member for operating the triple spacer mechanism;

Fig. 13 is a top view of the parts shown in Fig. 12;

Fig. 14 is a side elevational view of the program switch unit involving a set of motor driven cams and a set of Acro-switches;

Fig. 15 is an end view of the unit shown in Fig. 14;

Fig. 16 shows the cams employed in the program switch;

Fig. 17 is a plan view of a carriage stop bar provided on the typewriter and a solenoid to cam the bar downward from the position shown for interposing two additional tabulator stops on the typewriter;

Fig. 18 is a view of the parts shown in Fig. 17 but with the bar cammed down by the solenoid to a required operating position;

Fig. 19 shows a simplified diagram of the electrical circuit of the machine, part of which is shown schematically;

Fig. 19A is a duplicate of Fig. 19 showing reference numerals given throughout this description;

Fig. 20 shows a bank of numeral switches employed in connection with the typewriter bars;

Fig. 21 shows a bank of solenoids for operating the typewriter numeral bars after a calculation is made;

Fig. 22 shows how the sheets showing Figs. 20 to 26A, inclusive, may be relatively arranged to facilitate an understanding of the machine;

Fig. 23 is a circuit continuation of the circuits shown in Figs. 20 and 21, and shows the control unit numeral relays;

Figs. 24 and 24A show the electrical circuits of the "A" and "B" calculator dial readout units;

Figs. 25 and 25A show the electrical circuits of the "A" calculator selection unit; and Figs. 26 and 26A show the electrical circuits of the "B" calculator selection unit.

The apparatus provided in this invention comprises an electrical typewriter, an electrical calculator, and a program control apparatus all connected in an electrical system.

The typewriter is operable to type letter and number symbols on paper sheets when the keys of the typewriter are manually operated in the usual way. It is also operable, through switches associated with movable parts of the key-controlled members, to set up contact conditions in a control unit to control the operation of an electrical calculator constructed along the general lines of a type frequently employed in making arithmetical calculations. The typewriter is also operable through a set of solenoids, under control of the calculator through the control unit, to print on the bill amounts calculated and accumulated in the calculator.

GENERAL OPERATION

The principal components of this machine are:
(a) One typewriter.
(b) Two calculators (one or more could be used).
(c) One control unit.

The typewriter and calculator are provided with an electrical input and output. In general, any output can transmit numerical information to any input, or combination of inputs. The transmission of any output to any input or inputs, is always via the ten numeral control relays in the control unit. Whether or not a certain output is transmitting to a certain input or inputs is determined by certain elements to be covered later. The transmission of numbers is always sequential, i.e., only one digit at a time may be transmitted.

TYPEWRITER NUMERAL SWITCHES

The output for the typewriter consists of a bank of switches closed by the respective numeral type bars. Mechanically, these are shown in the upper part of Fig. 3. These switches set up contact conditions in the control unit to control the operation of an electrical calculator. Electrically, these switches are shown in Fig. 20.

TYPEWRITER KEY SOLENOIDS

The typewriter key solenoids comprise the typewriter input. These solenoids, under control of the calculator by way of the control unit, print the bill amounts calculated and accumulated in the calculator(s). Mechanically, these are shown in the lower part of Fig. 3. Electrically, these are shown in Fig. 21.

CALCULATOR ACCUMULATOR READOUT

In calculators of the general type that may be employed in this invention, multiplier means are provided in order that base amounts may be multiplied a required number of times and by a predetermined multiplier figure. A dividend figuring means represented by a movable tabulator button, commonly called a "dividend entry" key, is also provided in the calculator. Calculators found suitable for use in the present invention might be, for example, of the type shown in C. M. Friden et al., Patents Nos. 2,399,917 and 2,403,273, issued May 7, 1946 and July 2, 1946, respectively, but modified in some respects to make them more suitable for control through electrical systems.

When the typewriter and calculators are equipped and arranged as indicated in this invention and the typewriter and calculators are suitably conditioned and operated, a base amount may be typed on a bill, a percentage of the base amount may be calculated and subsequently typed on the bill, and a total of the base amount and percentage may be computed and typed on the bill without requiring any manual or mental figuring of the percentage or total, and without any manual typing of the percentage and total.

The apparatus of this invention is suitable for use as a billing machine and may be used to considerable advantage in preparing bills for telephone or other services wherein some of the items charged on the bill are taxable and the taxes must be computed during the preparation of the bill. The apparatus shown herein and described is suitable for preparing a telephone bill in which a plurality of kinds of telephone calls are charged on a bill and two of the kinds of services are taxable at different rates. In order to take care of the two different rates of taxation, two calculators "A" and "B" are provided, each being set to compute a tax of a predetermined different percentage. For example, one calculator "A" may be set to compute 15% of a taxable item entered in the calculator and the second calculator "B" might be set to calculate 25% of a taxable item entered in the second calculator.

The 15% taxable items are typed in the left-hand amount column of the bill by the typewriter and, in doing this, the position of the carriage of the typewriter is utilized to operate a switch to switch into connection with the typewriter, the "A" calculator.

The 25% taxable items and other than the 15% taxable items are typed in the right-hand amount column and, in doing this, the position of the carriage of the typewriter is utilized to switch into connection with the typewriter, the "B" calculator.

During the computing cycle, the totals in the calculators are read out and printed, the taxes are computed and printed and the respective totals added to them. For the grand total, the amount in the "B" calculator is read out and automatically put into the "A" calculator and is subsequently read out and transferred to the typewriter to operate the typewriter to print the grand total.

In order that the typewriter may control the operation of the calculators, electrical switches are mounted in the typewriter, such switches being operated by some moving parts of the mechanism operable each time a number key of the typewriter is operated. The electrical switches that apply to the typewriter are in control of an electrical control unit located between the typewriter and the calculators; the control unit being operable to control the calculators in accordance with the numerals typed by the typewriter and required to be entered and accumulated in the calculators. The calculator employed in each case is, in general, a conventional form of calculator, but for the purpose of making it adaptable for use in the invention, it is modified by removing the numeral keyboard and providing in place thereof a selector unit for controlling the selecting slides of the calculator.

The control unit which, in the present illustration, is common to the two calculators, involves a cam equipped program control unit and a system of relays controlled by the program control unit, and the key-controlled switches of the typewriter, and is operable to control a solenoid selector unit in each calculator and solenoids operable to operate push-type control keys of the calculators.

As shown in Fig. 1, the complete apparatus comprises four main units, namely, an electrically operated typewriter 101, a first calculator 102, a second calculator 103, and a control unit 104, the typewriter 101, calculators 102, 103 and the control unit 104 being mounted in a modified office desk 105 equipped with a hinge-supported back door 106.

As shown in Fig. 2, the typewriter 101, the calculators 102, 103 and the control unit 104 are electrically connected for automatic operation through the wire systems 107, 108 and 109, all of which are fed from a supply line 110 equipped with a plug 111 that may be connected to a suitable source of current supply, not shown. The typewriter 101, as shown briefly in Fig. 3, comprises a suitable frame 112 in which are mounted sets of manually operable keys 113 operable through linkages 114 to cause key bars 115 carrying type symbols 116 to strike a platen 117. The keys 113, linkages 114, key bars 115 and type symbols 116, as well as the platen 117, are conventional in electrically operated typewriters. In the present invention, however, the typewriter has been modified by the addition of solenoids 181 to operate the keys 113 and consequently cause the key bars 115 to operate to bring the type symbols 116 into engagement with the platen 117. The typewriter 101 has also been modified by the addition of a set of Acro-switches 166, mounted on a suitable apertured bar 120 which is mounted in the typewriter 101 so that it extends transversely across the position of linkages 114 in the typewriter structure. Bar 120 supports movable pins 126 and comprises a bracket portion 121 bolted in place by the bolts 122, the bracket 121 being apertured to receive mounting bolts 123 which extend through apertures in the switches 166. The linkages 114 are operable to move the pins 126 to operate the switches 166.

CONTROL BOX

Added to the typewriter and located to the right of the keyboard, is a box containing control keys $K_C$, $K_-$, and $K_T$, two indicating lamps, one red and one yellow, and a four-pole double-throw switch 891–N. All are shown in the circuit diagram in Fig. 19, and the box can be seen in Figs. 1 and 2.

SELECTING SLIDES

The selecting slides in calculators of the type shown in Figs. 1 and 2, are arranged in pairs so that there is a separate pair of selecting slides for each order of digits. One selecting slide in the pair is operable by keys representing digits from "1" to "5," inclusive, and the other selecting slide in the pair is operable by keys representing digits from "6" to "9," inclusive. When keys representing digits from "1" to "5" are operated in a particular order or column, one of the selecting slides of the pair serving that order is moved against the action of its restoring spring. When keys representing digits from "6" to "9," inclusive, are operated in the same particular order, the other selecting slide of the pair is operated. Each selecting slide controls the positioning of a gear relative to an actuator, comprising a toothed rotatable cylinder, the actuator being operable through the gear controlled by the selecting slide, and a system of gears to drive the numeral wheels in a register part of the calculator.

In the present invention the selecting slides are normally spring-loaded and are selectively released by operation of a stepping cam shaft 146 (Figs. 5, 6 and 6A) which trips latches on the selecting slides to allow the selecting slides to move against a system of gate bars 234 to 237, inclusive, which are operated to control the extent of movement of the selecting slides. The gate bars are moved by means of levers which are operable by means of the solenoids 491, 499, 506, 513 and 526, which are selectively operated either by operation of numeral keys of the typewriter 101 when records are being put into the calculator 102 or 103, or by operation of the readout means comprising numeral wheel operated switches in the calculator. The stepping cam shaft 146 is rotatable and longitudinally movable and is positioned transversely of the selecting slides 54 to 65, inclusive, as shown in Figs. 5 and 6, and in position to control the levers 201 to 212, inclusive, provided on the selecting slides 54 to 65, inclusive. The stepping cam shaft 146 is provided with the cams 140 to 145, inclusive, which are progressively distributed in a helical pattern about the cylindrical outer surface of the shaft, as shown in Fig. 6A. Normally, the stepping cam shaft 146 is positioned so that, upon suitable rotation of the shaft, the cam 140 will extend into a space between the selecting slides 54 and 55, the cam 141 will extend into a space between the selecting slides 56 and 57, the cam 142 will extend into a space between the selecting slides 58 and 59, the cam 143 will extend into a space between the selecting slides 60 and 61, the cam 144 will extend into a space between the selecting slides 62 and 63 and the cam 145 will extend into a space between the selecting slides 64 and 65. In this position, if the stepping cam shaft is rotated, the cams on the stepping cam shaft will have no effect on the levers 201 to 212, inclusive, or the selecting slides 54 to 65, inclusive. The stepping cam shaft 146, however, is longitudinally movable to either the right or the left as required to bring the cams 140 to 145, inclusive, in register with the latches on the right-hand selecting slides of each pair or the left-hand selecting slides of each pair. The digits in the typewriter and the calculator from "1" to "9" are divided into two orders; namely, a low order for "1" to "5" and a high order from "6" to "9." In the calculator and with reference to Figs. 5 and 6, the selecting slides 54, 56, 58, 60, 62 and 64 are the selecting slides for the low order digits in the calculator. The selecting slides 55, 57, 59, 61, 63 and 65 are the selecting slides for the high order digits in the calculator. When a key in the typewriter 101 is depressed to type a required digit on a record sheet, suitable solenoids in the selector solenoid control unit 400 are energized to insure that the required digit will be entered into the calculator, in cases where a calculation is required.

With reference to Figs. 7 and 8 and assuming that the digit operated in the typewriter is of a low order, from "1" to "5," the solenoid 426 in the control unit 400 will be energized to cause the shaft 146 to move to the left of the position shown in Figs. 5 and 6. This will bring the cams on the stepping cam shaft 146 into register with the latches on the left-hand selecting slides 54, 56, 58, 60, 62 and 64 in the calculator and, upon suitable rotation of the stepping cam shaft 146, the cams 140 to 145, inclusive, will individually operate to release an associated latch on a selecting slide of the low order, the selecting slide being, in turn, released to bear against the system of gate bars 234 to 237, inclusive. If the digit to be entered into the calculator is a digit "1," the solenoid 491 will be operated to operate the levers 450 and 451 to selectively position the gate bars 234 to 237, inclusive, to such relative positions that the appropriate left-hand selecting slide in the calculator will be permitted to move downwardly under the action of its spring to bring a required gear in the calculator into engagement with the appropriate actuator in order that the required digit may be entered into the calculator. If the digit key operated in the typewriter is one of a high order, from "6" to "9," the solenoid 427 in the selector solenoid control unit 400 will be energized to move the cam shaft 146 to the right of the position shown in Figs. 5, 6 and 6A. In this case, when the cam shaft 146 is suitably rotated, the cam 140 will have the effect of releasing the selecting slide 55; cam 141 will have the effect of releasing the selecting slide 57; cam 142 will effect releasing of the selecting slide 59; cam 143 will effect releasing of the selecting slide 61; cam 144 will effect releasing of the selecting slide 63; and cam 145 will effect releasing of the selecting slide 65. Release of the selecting slides will bring them into control of the gate bars 234 to 237, inclusive, which are selectively controlled for movement to the required positions by operation of the solenoids 491, 499, 506, 513 and 526. If the high order digit to be entered is the digit "9," the solenoid 513 will be energized to operate the levers 481 and 482 to relatively position the gate bars 234 to 237, inclusive, so that the high order selecting slide for the digit "9" will be allowed to pass through the gateways in the gate bars 234 to 237, inclusive, to bring the gear system in the calculator into position for operation by the actuator for the digit "9" in the calculator to enter into the calculation, the digit "9."

The gate bars 234, 235, 236 and 237 may be relatively moved to positions to permit the selecting slides in the calculator to move to positions for putting into the calculation the digits "1" to "9," inclusive, by selective operation of the solenoids in the selector solenoid control unit 400. By operation of the solenoids in combination as follows, the digits "1" to "9" may be entered in the calculator: Solenoids 426 and 491 for the digit "1"; solenoids 426 and 499 for the digit "2"; 426 and 506 for the digit "3"; 426 and 513 for the digit "4"; 426 and 526 for the digit "5"; 427 and 491 for the digit "6"; 427 and 499 for the digit "7"; 427 and 506 for the digit "8"; 427 and 513 for the digit "9." The shaft 146 is operable to be rotated in one direction against the action of a spring 152 and is controlled in its reverse rotation by means of an escapement 147 (Figs. 9 and 10) involving the ratchet wheel 148 and the pallet 149. The pallet 149 is operable in one direction by means of the plunger 552 of a solenoid 553 against the action of a return spring 554, one end of which is secured to the pallet 149, the other end being attached to a fixed support. Operation of the solenoid 553 steps the stepping cam shaft 146 one escapement step for each pulse to permit the calculator to record a zero.

The ratchet wheel 148 has a special tooth 135 of such dimension that it will not pass free of the sides of the slot 561 in the stop 558 when the shaft 146 is moved lengthwise. This prevents further progressive escapement of the cam shaft 146 when the special tooth 135 reaches the stop 558.

The stepping cam shaft 146, as shown in Fig. 11, may be backspaced in steps by operation of a solenoid 539, the plunger 540 of which bears against a pivotally supported pawl 541 operable downwardly under the thrust of the plunger 540 and against the pinion 542 on the shaft 146. The solenoid 539 may be under control of a corresponding solenoid, or relay, in control of the backspace member on the typewriter 101.

CONTROL OF FUNCTIONAL KEYS IN CALCULATORS

The calculators employed in this apparatus are provided, as shown in Fig. 4, with solenoid members to control various functional keys, or other usual manually operable members of the calculator, to make the calculator operate to add, subtract, multiply or calculate numbers as required. The solenoids may be controlled from a typewriter position and through a suitable control unit. As shown in Fig. 4, there is a solenoid 543 having a plunger 544 in engagement with a dividend key 545 on the calculator. There is also a solenoid 546 having a plunger 547 in engagement with the minus key 548 of the calculator; a solenoid 549 having a plunger 550 in engagement with the add key 551 of the calculator; a solenoid 555 having a plunger 556 in engagement with a lever 557 is provided to control the multiplication apparatus of the calculator. Energization of the solenoids 543, 546, 549 and 555 abovementioned would be equivalent to manual depression of the usually manually operated functional keys of the calculator. Since the solenoids can be remotely controlled, they may be controlled either from a typewriter position or from a suitable control box located at some convenient point and from a control unit operating to make the typewriter apparatus and the calculators go through required cycles of operations in recording numerals, calculating amounts, taking percentages of amounts, summing up the amounts and typewriting the amounts on a suitable record sheet. Since the calculators are provided with solenoid means to operate various control keys thereof and with solenoid controlled means for operating the selecting slides of the calculator, and with the solenoids, in control of a calculator, under the control of the keys of a typewriter, it is quite apparent that required amounts may, in effect, be put into the calculator apparatus by operation of the digital keys of a typewriter; that the calculator may be set into operation to add, subtract, or multiply the amounts accumulated therein, and that the calculator may be, in effect, made to read back into the typewriter and control the typewriter keys to type the amounts accumulated and calculated in the calculator.

As shown in Figs. 20, 21, 23, 24, and 25, an electrical system is provided between the typewriter apparatus 101 and the calculating apparatus 102, 103. Fig. 20 shows a set of switches 166 operable by means of the numeral type bars of typewriter keys 129 shown in Fig. 3. Fig. 23 shows a set 167 of control unit relays which are operable to relay signals from the typewriter to the calculators, and from the calculators to the typewriter, or from one calculator to another, or to itself. In the typing-in operation, the relays in the set 167 are controlled by means of the switches shown in Fig. 20, the control unit relays 167 being operable to control a set of solenoids in the solenoid selector unit 400 shown in Figs. 3 and 6 and contained in the calculator. The control unit relays 167 are also in circuit connection with readout selector switches shown in Fig. 24, and which are supported on parts of the calculator apparatus involving numeral wheels of the calculator and the carriage of the calculator apparatus. The switches of Figs. 24 and 24A are used as readout switches to read out amounts accumulated in the calculators. Figs. 25, 25A, 26 and 26A show the selection gate solenoids and the escape shaft solenoids of selector solenoid unit 400, which are in circuit connection with the control unit relays shown in Fig. 23. The selector solenoid unit 400 is also shown in Figs. 7 and 8. Both sets of solenoids shown in Figs. 21 and 25 are controllable either together, or one set at a time, by the control relays shown in Fig. 23. The switches 166 shown in Fig. 20 are controlled by means of the typewriter member keys representing the numbers from "0" to "9" and are identified in Fig. 20 as $T_0$, $T_1$, $T_2$, $T_3$, $T_4$, $T_5$, $T_6$, $T_7$, $T_8$, and $T_9$ switches, there being duplications of the switches $T_0$, $T_5$, $T_1$ and $T_2$ by reason of the automatic two-digit keys on the typewriter. Each of the switches 166 can be closed by operation of the associated typewriter key to control an associated control unit relay in the set of relays 167, shown in Fig. 23, and numbered from "1" to "0." The relays 167, shown in Fig. 23, are used in extending the control from the typewriter switches 166 to, in the first place, solenoids, shown in Fig. 25, in the selector solenoid unit 400, shown in Figs. 5, 6, 7, 8 and 9, and comprising in each calculator the solenoids 491, 499, 506, 513, and 526, which are operable to selectively control the set of gate bars 234, 235, 236 and 237, which are selectively operated to control the movement of selecting slides in the calculators "A" and "B," shown in Figs. 1 and 2. When the switches 166 are operated by means of the typewriter keys and the corresponding control unit relays 167 and accompanying switches, shown in Fig. 23, representing the same numerals represented by the depressed typewriter keys, the required solenoids in the selector solenoid unit 400 are suitably operated to selectively operate the gate bars in the selector solenoid unit 400. Thus, the selecting slides in the calculating machines "A" and "B" will be selectively operated so that the calculating machines "A" and "B" will record on their numeral wheels, the number represented by the depressed keys of the typewriter. The calculating machines "A" and "B" will record, in the usual manner on their numeral wheels, numbers indicating the amounts that have been fed into the calculating machines "A" and "B." The numeral wheels of the calculating machines "A" and "B" will also operate corresponding readout switches, movable parts of which are applied to the numeral wheels of the calculating machines "A" and "B." The readout switches are shown in Figs. 24 and 24A, and may be equal in number to the number of numeral wheels provided in the calculating machines "A" and "B," but for the purpose of illustrating this invention, only four readout switches have been shown, the readout switches being numbered 169, 170, 171 and 172. The readout switches 169, 170, 171 and 172 comprise, respectively, a set of radially arranged fixed contacts 173 and a wiper contact 174, a set of radially arranged fixed contacts 175 and a wiper contact 176, a set of radially arranged fixed contacts 177 and a wiper contact 178 and a set of radially arranged fixed contacts 179 and a wiper contact 180. The switches 169, 170, 171 and 172 will represent, by the positions of their wiper contacts on their sets of relatively fixed contacts, the amounts accumulated in the calculating machines "A" and "B," and may be brought into circuit connection with the control unit relays, as shown in Fig. 23, to, in effect, read out from the calculating machines the amounts accumulated therein, the readout being by way of contacts controlled by the control unit relays 167, shown in Fig. 23, and carrying the readout information to the typewriter to operate the set of typewriter solenoids 181 representing the numerals "1" to "0," inclusive. In the operation of recording on the numeral wheels, the calculator is operated to go through its conventional plus or minus cycles.

READOUT OPERATION

Upon operation of the readout switches 169, 170, 171 and 172 to control the control unit relays 167, shown in Fig. 23, in the readout operation, the corresponding typewriter solenoids 181 will be operated to operate the typewriter keys to typewrite the numbers represented on the numeral wheels of the calculating machines "A" and "B" and indicated by the positions of the readout switches 169, 170, 171 and 172. For example, if the typewriter key representing the numeral "1" is operated, the control unit relay "1" in the set of relays 167 will be operated to control the operation of the selecting solenoid unit 400 to operate the solenoids 426 in the "A" or "B" calculators, and operate the solenoids 491 in the "A" or "B" calculators, which thereupon will register the numeral "1" in the switches 169 or 171. Selection of the calculator "A" or "B" will depend on the nature of the entry and the relative positions of some of the parts of the typewriter. When the apparatus is subsequently operated to read out from the calculating machines "A" or "B" and into the typewriter, the control unit relay #1 in the set 167 will be operated to extend the control from the selector switches 169 or 171 to the typewriter 101 so that the typewriter solenoid #1 in the set of typewriter solenoids 181 will be operated and the typewriter key representing the "1" will be operated to print the "1" on a record sheet supported on the platen of the typewriter machine. The circuit for the input to the calculator can be traced as follows: In Fig. 19, conductor $L_1$, conductor 182 to 730, 727, 728, 191, 193, 192, 183, 194 to switch $T_1$ in Fig. 20, represented in three places by movable contacts 1—1—1 which may be closed against corresponding fixed contacts $l_1$, $l_2$, and $l_3$ in circuit connection with respective conductors 184, 185 and 186, leading to conductor 187 in cable 187. From conductor 187 to conductor 188 (Fig. 23), winding of relay #1 of the numeral relays 167, conductor 189, conductor 190, conductor 1094 (Fig. 19) to line wire $L_2$.

In the typing-in operation, the position of the column in which the record is being made determines whether the amount being put into a calculation will go into the "A" or "B" calculators. The "A" and "B" calculators may be set for different multipliers. For example, the "A" calculator may be set to calculate 15% of amounts entered therein and the "B" calculator may be set to calculate 25% of the amounts entered in the "B" calculator. A switch is provided on the typewriter and controlled by cams on the carriage to control the entering of amounts in the "A" and "B" calculators.

For another example, and assuming that the number typed by the typewriter 101 was "6," and the amount should be entered in the "A" calculator, the circuit would be as follows: Line wire $L_1$ (Fig. 19), conductor 182, conductor 730, movable contact 727, lefthand fixed contact 728, conductor 191, movable contact 193, left-hand fixed contact 192, conductor 183, conductor 194, to movable contact of $T_6$ (Fig. 20), to the fixed contacts thereof, conductor 195, conductor 196, winding of relay #6 of the group of relays 167, shown in Fig. 23, conductor 197, conductor 198, conductor 190, conductor 1094 (Fig. 19), to line wire $L_2$. Relay #6, upon being operated, will close its movable contacts 199 (Fig. 23), against its fixed contacts 100, 85, 98 and 97. Through its fixed contact 97 and conductor 96, the circuit will be extended from line wire $L_1$, conductor 90, conductor 79, conductor 89, movable contact 88, fixed contact 97, over conductor 96, conductor 95, conductor 94 of cable 93 (Fig. 25A), winding of solenoid 427 in the "A" calculator, conductor 92, conductor 91, and ultimately to line wire $L_2$, by way of conductor 942 (Fig. 19), left-hand fixed contact 1095, movable contact 971, conductor 972, left-hand fixed contact 1096 of switch $P_X$, movable contact 870, left-hand fixed contact 879, movable contact 880, conductor 882, left-hand fixed contact 883, movable contact 884, conductor 886, right-hand fixed contact 887, movable contact 888 of switch $T_{AB}$, point 770, conductor 771, point 772, right-hand fixed contact 752 of switch $T_S$, movable contact 753, conductor 755 to line wire $L_2$. Assuming that the digit "6" should be entered in the "B" calculator, relay #6, through operation of its movable contacts 199 and against its fixed contacts, establishes another circuit as follows: Line wire $L_1$, conductor 90 (Fig. 23), conductor 79, conductor 89, movable contact 88B, fixed contact 98, conductor 96B, conductor 94B (Fig. 26A), winding of solenoid 427, controlling the escapement shaft of the "B" calculator, conductor 92B, and ultimately to line wire $L_2$ by way of conductor 916 (Fig. 19), conductor 945, left-hand fixed contact 946, movable contact 947, conductor 927, left-hand fixed contact 928 and movable contact 888 of switch $T_{AB}$, point 770, conductor 771, point 772, right-hand fixed contacts 752, and movable contact 753 of switch $T_S$, conductor 755 to line wire $L_2$. Operation of solenoid 427 conditions the escape shaft solenoid control for the "B" calculator so that operation of solenoid 491 of the selection gate solenoids in the "B" calculator will control the gate bars so that a selecting slide for the numeral "6" will be operated in the "B" calculator, and the numeral wheel for the "B" calculator will move its wiper contact 174 (Fig. 24A) to a fixed contact representing the numeral "6." The circuit through the solenoid 491 may be traced as follows: Conductor 90 (Fig. 23), conductor 89, set of movable contacts 199, movable contact 86, fixed contact 85, conductor 84, conductor 83 (Fig. 26), winding of solenoid 491, conductor 82, conductor 993, conductor 991 (Fig. 19) to line wire $L_2$.

After the numeral "6" or any other numeral has been put into either or both of the calculators, the numerals can be read out from the calculators to the typewriter. The readout circuit for the numeral "6" registered in the "A" calculator may be traced as follows: Line wire $L_1$ (Fig. 19), conductor 934, point 935, movable contact 936, right-hand fixed contact 1020, conductor 74, readout contact 75, wiper contact 180 (Fig. 24), selector switch 172, fixed contact "6" of selector switch 172, conductor 168, cable 1100, conductor 196, winding of relay #6 of relays 167 (Fig. 23), conductor 197, conductor 198, conductor 190, conductor 1094 (Fig. 19), to line wire $L_2$. Relay #6 in operating, closes its outermost movable contact 80 against fixed contact 100 to close the circuit for the energization of solenoid $S_{6T}$ in the solenoids 181 in the typewriter. When the solenoid $S_{6T}$ in the typewriter is operated, the typewriter operates to print the numeral "6" on a record sheet supported on the platen of the typewriter. The circuit for the energization of solenoid $S_{6T}$ may be traced as follows: Line wire $L_1$, conductor 90 (Fig. 23), conductor 79, conductor 89, outermost movable contact 80 of relay #6, contact 100, conductor 740 through cable 734, winding of solenoid $S_{6T}$ (Fig. 21), conductor 50, conductor 77, conductor 76, conductor 965 (Fig. 19), movable contact 963 and fixed contact 964, conductor 966, conductor 967, left-hand fixed contact 968 and movable contact 799 of switch $P_{MB}$, conductor 750, conductor 751, point 772, right-hand fixed contact 752 and movable contact 753 of switch $T_S$, conductor 755 to line wire $L_2$.

Calculators of the type above-mentioned are provided with function keys to be operated to make the calculator operate to add, subtract, multiply and do various other calculations mechanically. The function keys are depressible keys and are usually operated manually. In this invention solenoids are provided to operate the usual depressible function keys, with exception of those not required for this invention, on the calculator, the solenoids being arranged, for example, as shown in Fig. 4, in which the solenoid 543 is operable to depress the dividend key of the calculator, the dividend key in this toll biller setup of the invention being not used as a dividend entry key, but as a tabulating member. The solenoid 546, when energized, is operable to depress the minus key 548 of the calculator. The solenoid 549 is operable to depress the plus key 551 of the calculator, and the solenoid 555 is operable to depress a lever 557, which has mechanical connection with the mechanism in the calculator to make the calculator operate to multiply one number by another. To control the operation of the solenoids in this apparatus in accordance with a predetermined program, the program control unit 104 is provided.

PROGRAM CONTROL UNIT

The program control unit 104, as shown particularly in Figs. 14 and 15, comprises an electric motor 680, a set of cams 681 mounted on a shaft 682, and a set of switches 683 controlled by means of the cams 681. A set of relays, indicated by the prefix "R," not shown in Figs. 14, 15, and 16, but shown in the circuit in Figs. 19 and 19A, is provided in the program control unit 104. The program control unit 104 is designed to operate two calculators, namely, the calculators "A" and "B," identified as 102 and 103, respectively, shown in Fig. 1. The cams in the set 681 are contoured and arranged on the shaft 682 so that the cams will engage projections 684 of movable members in the switches 683. The set of cams 681 comprises (as shown in Fig. 16) the cams in the order shown in Fig. 14, the cams being identified as 685, 686, 687, 688, 689, 690, 691, 692, 693, 694, 695 and 696. Cam 685 has two high spots 697 and 698 followed by a relatively short high spot 699 having a following relatively long high spot 700. Cam 686 has a single high spot 701; cam 687 has a single high spot 702; cam 688 has a single high spot 703; cam 689 has a single but relatively long high spot 704; cam 690 has a single relatively short high spot 705; cam 691 has two relatively short high spots 706, 707; cam 692 has two relatively short high spots 708, 709 almost diametrically opposite each other; cam 693 has two relatively long high spots 710 and 711 diametrically opposite each other; cam 694 has a single high spot 712; cam 695 has two low spots 713 and 714 and cam 696 has one small low spot 715. The switches in the set 683 may be switches of the Acro-type, in which a movable spring contact member operates against a fixed contact. The switches are identified as $P_T$, $P_P$, $P_6$, $P_C$, $P_{DA}$, $P_{DB}$, $P_{MA}$, $P_{MB}$, $P_-$, $P_X$, $P_+$, and $P_Y$ to identify them with the same indications in Figs. 19 and 19A. In an actual setup of the apparatus, the motor 680 was a 4 R.P.M. Telechron motor which operated for a program of 15 seconds, in which the switch $P_6$ is already closed and will remain closed for about 1 second more. $P_P$ will close in about ¼ second and will remain closed for about 8½ seconds (opening for about 2 seconds and then closing again for about 2¼ seconds), $P_T$ will close in about ⅓ second and will remain closed for about 14½ seconds. $P_C$ will close in about 1 second and remain closed for about 3½ seconds, and then will be open and remain open for about 5½ seconds, and then close for about 3½ seconds. $P_{DA}$ will remain open for about 4½ seconds and then will close for about ½ second, opening again for about 5¾ seconds and then closing for about ½ second. $P_{DB}$ will remain open for about 5¾ seconds and then will close for about ¾ second, and then will open for about 2¼ seconds and will then close for about 9/10 second. $P_{MA}$ will be open for about ½ second and then will close for about ½ second. $P_{MB}$ will remain open for about 2 seconds and then will close for about 1¾ seconds. $P_-$ will remain open for about 13 9/10 seconds and then will close for about 9/10 of a second. $P_X$ will remain open for about 10½ seconds and then will close for about ½ second. $P_+$ will remain open for about 9 1/10 seconds and then will close for about ½ second. $P_Y$ will remain open for about 2½ seconds and will close for about ¼ second, will open for about ½ second and close for about ½ second, will open for about 8 seconds and then will close for about ¼ second, will open again for about ½ second and then will close for about 2½ seconds.

When the complete program is to be started, the compute initiating switch $K_C$ (Fig. 19A) is operated to close its movable contact 716 against fixed contact 717, to close a circuit for the program motor 680. The circuit for operation of the program motor 680 may be traced as follows: Line wire $L_1$ (Fig. 19A), conductor 182, conductor 718, conductor 719, contact 717, movable contact 716, conductor 720, binding post 721, conductor 722, winding of motor 680, conductor 723, fixed contact 724 and movable contact 725 of relay $R_Q$, conductor 726 to line wire $L_2$. The line wires $L_1$ and $L_2$ are the main current supply lines of the electrical system and are arranged for connection to a suitable source of current supply, not shown but, which may be a 60 cycle, 110 volt, A.C. current supply source. In about ⅓ of a second after the switch $K_C$ is closed, the motor 680 will have rotated the cam 696 to operate the switch $P_T$ to move its movable contact 727 away from its left-hand contact 728 and into engagement with its right-hand fixed contact 729. The switch $P_T$ is, in effect, a single-pole double-throw switch and operates to close the motor circuit for the duration of the program, the motor circuit being then traceable as follows: Line wire $L_1$ (Fig. 19A), conductor 182, conductor 730, movable contact 727, fixed contact 729 of switch $P_T$, conductor 731, conductor 720, binding post 721, conductor 722, winding of motor 680, conductor 723, fixed contact 724 and movable contact 725 of relay $R_Q$, conductor 726 to line wire $L_2$.

The typewriter is operable to automatically tabulate to the first charge column as soon as the manually operated key $K_C$ is closed and the switch $P_T$ is transferred. Shortly after the motor 680 has started by the initial closing of the manually operated key $K_C$, and the subsequent establishing of the regular running circuit for the motor by the closing of contact 727 against fixed contact 729 by the operation of the switch $P_T$, the switch $P_P$ is closed by the operation of the high area 732 of the cam 695 to prepare a circuit for the operation of the typewriter solenoids, as shown in Fig. 21, for operation of the typewriter keys. The circuit may be traced as follows: Line wire $L_1$, conductor 90 (Fig. 23), movable contacts of the set of relays 167, conductors 735 to 744, inclusive, in cable 734, to windings of solenoids $S_{1T}$, $S_{2T}$, $S_{3T}$, $S_{4T}$, $S_{5T}$, $S_{6T}$, $S_{7T}$, $S_{8T}$, $S_{9T}$, $S_{0T}$, $S_{ST}$, conductor 76, fixed contact 124 (Fig. 19A) of $P_P$, and movable contact 125 of $P_P$, conductor 745, conductor 746, left-hand contact 747 and movable contact 748 of manual switch N-891, conductor 750, conductor 751, right-hand contact 752, and movable contact 753 of switch $T_S$-754, conductor 755, to line wire $L_2$. The switch $T_S$-754 normally has its movable contact 753 resting against its left-hand fixed contact 756, but is operated to have its movable contact 753 moved against its fixed contact 752 by operation of the carriage of the typewriter which operates to close the movable contact 753 against the fixed contact 752 when the typewriter carriage is in such position that the typewriter will operate to print the energized characters in the "A" and "B" six-place amount columns of the bill to be typed. Therefore, when the readout occurs from the numeral wheels in the calculators to operate the required solenoids in the set 181 in the typewriter, the number characters brought into operation in the typewriter by operation of the solenoids representing the numbers from "0" to "9," will be typed in the required columns in the bill under preparation.

During all of the first second, the $P_6$ switch is closed so that its movable contact 758 is against its fixed contact 759 to provide a control circuit for the solenoid 760, which is known as the solenoid $S_{6B}$, which operates to restore the stepping cam shaft 146 in the "B" calculator to a "six-place clear condition," the solenoid 760-$S_{6B}$ being mechanically attached to the lever operable to move the curved rack 150 (Fig. 11) in the "B" calculator to rotate the stepping cam shaft to a "six-place clear position." The circuit for operation of the solenoid 760–$S_{6B}$ may be traced as follows: Line wire $L_1$ (Fig. 19A), conductor 182, conductor 730, movable contact 727 of the $P_T$ switch, right-hand contact 729 of the $P_T$ switch, conductor 731, conductor 720, binding post 721, conductor 762, movable contact 753, fixed contact 759 of program switch $P_6$, conductor 764, winding of solenoid 760–$S_{6B}$, conductor 765, fixed contact 766 of relay $R_Q$–767, movable contact 768 of relay 767, conductor 769, fixed contact 780 of relay $R_{S2}$–980, movable contact 782 of relay $R_{S2}$–980, conductor 783, conductor 784, fixed contact 785 of $P_C$, movable contact 786 of $P_C$, conductor 787 to line wire $L_2$.

About ¾ second after the program motor 680 has started, the switch $P_{MA}$ is operated to close the circuit for the operation of solenoid 555 which will operate through its plunger 556 (Fig. 4) in the "A" calculator to press down a multiplication lever 557 which sets the calculator in operation to perform any multiplication operations necessary in computing the charges required. The circuit completed by the operation of the cam operated switch $P_{MA}$ may be traced as follows: Line wire $L_1$ (Fig. 19A), conductor 182, conductor 730, movable contact 727, and a right-hand contact 729 of switch $P_T$, conductor 788, conductor 789, winding of solenoid 555–$S_{MA}$, conductor 790, fixed contact 791 and movable contact 792 of program switch $P_{MA}$, conductor 794 to line wire $L_2$.

About 1 second after the beginning of the program, switch $P_C$ is operated for a period of about 3½ seconds and is again operated, about 10 seconds after programming begins, for a period of about 3½ seconds. Operation of switch $P_C$ completes a circuit to the carriage clearing solenoids $S_{CA}$ and $S_{CB}$. This circuit is traceable from line wire $L_1$, through conductor 182, conductor 730, contacts 727 and 729 of switch $P_T$, conductor 788, conductor 1039, windings of solenoids $S_{CA}$ and $S_{CB}$, conductor 1040, contacts 1041 and 786 of switch $P_C$ and conductor 787 to line wire $L_2$. Operation of switch $P_C$ also controls the circuit to the selection clearing solenoids $S_{6A}$ and $S_{6B}$. This circuit is traceable from the line wire $L_1$, conductors 182 and 730, contacts 727 and 729, conductors 788 and 1097, windings of solenoids $S_{6A}$ and $S_{6B}$, conductor 765, contacts 766 and 768 of relay $R_Q$, conductor 769, contacts 780 and 782 of relay $R_{S2}$, conductor 783, conductor 784, contacts 785 and 786 of switch $P_C$ and conductor 787 to line wire $L_2$.

About 1%0 seconds after the beginning of the program and subsequent to the operation of switch $P_{MA}$, switch $P_{MB}$ is operated for about 2 seconds to close the circuit for the operation of the multiplication solenoid 795 in the "B" calculator, the multiplication solenoid 795 being the equivalent in the "B" calculator of the multiplication solenoid 555 in the "A" calculator. The circuit for the operation of the solenoid 795 may be traced as follows: Line wire $L_1$ (Fig. 19A), conductor 182, conductor 730, movable contact 727 and right-hand fixed contact 729 of switch $P_T$, conductor 788, conductor 796, winding of solenoid 795, conductor 797, right-hand fixed contact 798, and movable contact 799 of switch $P_{MB}$, conductor 750, conductor 751, right-hand fixed contact 752 and movable contact 753 of $T_S$ switch 754, conductor 755 to line wire $L_2$. Operation of solenoid 795 in the "B" calculator is equivalent to operation of the multiplication key in a calculator to multiply the figures required therein in the calculation.

About 2½ seconds after the program starts, switch $P_Y$ is operated to partially complete a circuit for the operation of the solenoid 800–$S_{TAB}$ in the typewriter 101. Solenoid 800 in the typewriter is operable to move the tabulating key in the typewriter when tabulation is required, its operation through the $P_Y$ switch occurring twice in rather rapid succession to provide extra tabulation movements for the typewriter. The circuit for operation of the solenoid $S_{TAB}$–800 may be traced as follows, but this circuit applies only to the condition known as "Non Tax" condition in which the manual switch N–891 is operated to its right-hand fixed contact, the circuit being as follows: Line wire $L_1$ (Fig. 19A), conductor 182, conductor 730, movable contact 727 of switch $P_T$, fixed contact 729, conductor 788, conductor 801, winding of solenoid 800, conductor 802, binding post 803 of switch $P_Y$, movable contact 805 and right-hand fixed contact 806 of program switch $P_Y$, conductor 807, right-hand fixed contact 808 of switch N–891, movable contact 748 of switch N–891, conductor 750, conductor 751, right-hand fixed contact 752 of switch 754, movable contact 753, conductor 755 to line wire $L_2$.

About 4½ seconds after the beginning of the program, switch $P_{DA}$ is closed to provide a circuit for the operation of solenoid 543–$S_{DA}$, the function of which is to operate what is known as the "Div. Tab" key 545 (Dividend Key) in the calculator. The circuit for the operation of solenoid 543 may be traced as follows: Line wire $L_1$ (Fig. 19A), conductor 182, conductor 730, movable contact 727 of switch $P_T$, fixed contact 729, conductor 788, conductor 813 (Fig. 19), winding of solenoid 543, conductor 814, fixed contact 815 and movable contact 816 of switch $P_{DA}$, conductor 817, movable contact 810 and fixed contact 811 of manual switch N–891, conductor 819 to line wire $L_2$.

Shortly after the operation of the solenoid 543–$S_{DA}$ in the "A" calculator, a corresponding solenoid 821–$S_{DB}$ is operated in the "B" calculator to operate the "Div. Tab" key of the "B" calculator. The circuit for the operation of solenoid 821 is as follows: Line wire $L_1$ (Fig. 19A), conductor 182, conductor 730, movable contact 727, right-hand fixed contact 729, conductor 788, conductor 822 (Fig. 19), winding of solenoid 821, conductor 823, conductor 825, right-hand fixed contact 826 of program switch $P_{DB}$, movable contact 827, conductor 829 to line wire $L_2$.

About 9¾ seconds after the beginning of the program, switch 843–$P_+$ is operated to close the circuit for the operation of solenoids 844 and 845–$S_{+A}$ and $S_{+B}$, respectively, which operate to depress the plus keys in the respective calculators "A" and "B," such, for example, as the plus key 551 shown in Fig. 4. The circuit for the operation of the solenoids 844 and 845 may be traced as follows: Line wire $L_1$ (Fig. 19A), conductor 182, conductor 718, conductor 846, binding post 847, movable contact 849 and fixed contact 850 of switch 848–$T_H$, conductor 851, movable contact 852 and fixed contact 854 of relay $R_B$–917, conductor 855, movable contact 856 and fixed contact 857 of switch $B_R$–858, conductor 859, fixed contact 860 and movable contact 861 of program switch $P_+$, conductor 863, conductor 867, windings of solenoids 844 and 845 in parallel, conductor 868 to line wire $L_2$.

Shortly after the closure of switch $P_+$ the switch $P_{DA}$ is closed again for a brief interval to operate to close a circuit for the energization of solenoid $S_{DA}$–543 which operates to depress the "Div. Tab" key in the "A" calculator, such as the "Div. Tab" key 545 shown in Fig. 4, the circuit for operation of solenoid 543 being the same as previously described.

About 10½ seconds after beginning of the program, switch $P_X$ is operated to move its movable contact 870 against its right-hand fixed contact 878 to close the circuit for the operation of solenoid 800–$S_{TAB}$ to provide an extra tabulate pulse for the typewriter during the normal compute cycle. The circuit for the operation of the solenoid 800, involving the program switch $P_X$, may be traced as follows: Line wire $L_1$ (Fig. 19A), conductor 182, conductor 730, movable contact 727 and right-hand fixed contact 729 of switch $P_T$, conductor 788, conductor 801, winding of solenoid 800, conductor 802, movable contact 805, left-hand fixed contact 872, conductor 873, fixed contact 874, movable contact 875, conductor 877, fixed contact 878, movable contact 870, fixed contact 879, movable contact 880, conductor 882, fixed contact 883, movable contact 884, conductor 886, right-hand fixed contact 887, movable contact 888, conductor 771, fixed contact 752, movable contact 753 and conductor 755 to line wire $L_2$. The tabulate pulse is broken momentarily by the $T_T$ switch which transfers when the typewriter is tabulating, so $P_X$ gives repeated pulses (21 in number) to $S_{TAB}$ until carriage transfers $T_{AB}$ interrupting this circuit.

At about the same time as the solenoid 543 is operated the second time, the $P_Y$ program switch is again operated for a brief interval and then subsequently for a period of about 2½ seconds, operating each time to close a circuit for solenoid 800–$S_{TAB}$ which provides extra tabulate pulses to the typewriter 101 during the special compute cycle, the circuit for operation of the solenoid 800–$S_{TAB}$ being by way of the program switch $P_Y$, the same as previously described. The final closure of the program switch $P_Y$ remains until approximately the end of the program.

About 13¾ seconds after the beginning of the program, cam operated switch $P_-$ is operated to close a circuit for the operation of the two solenoids 830–$S_{-A}$ and 831–$S_{-B}$, the functions of which are to operate the minus keys in the "A" and "B" calculators, such, for example, as the minus key 548 shown in Fig. 4. The circuit for the operation of the solenoids 830 and 831 may be traced as follows: Line wire $L_1$ (Fig. 19A), conductor 832, conductor 833, fixed contact 834 and movable contact 835 of program switch $P_-$, conductor 837, movable contact 838, and fixed contact 839 of switch 891–N, conductor 841, windings of solenoids 830–$S_{-A}$ and 831–$S_{-B}$ in parallel, conductor 842 to line wire $L_2$. The solenoids 830–$S_{-A}$ and 831–$S_{-B}$ may also be operated under control of a correction switch 1117–$K_-$ over a circuit as follows: Line wire $L_1$, conductor 832, conductor 833, conductor 1118, fixed contact 1119 and movable contact 1120 of switch 1117–$K_-$, conductor 1121, conductor 841, windings of 830–$S_{-A}$ and 831–$S_{-B}$ in parallel, conductor 842 to line wire $L_2$.

SWITCH $T_{SP}$

Switch $T_{SP}$ is actuated by the spacing mechanism of the typewriter. This switch is in parallel with the typewriter zero selection switch. Operation of the space mechanism, in turn, operates switch $T_{SP}$ (Fig. 20) which closes a circuit to the zero relay (Fig. 23). Its function and circuit from there on is the same as for the typewriter zero key switch.

RELAY $R_Z$ (SUPPRESSION OF ZERO)

All zeros which occur prior to a numeral ("1" through "9") during the automatic readout operation of the calculators into the typewriter are suppressed. This is accomplished by a special relay ($R_Z$) (Fig. 21) which is mounted under the typewriter frame, a switch ($T_K$) which is operated by the typewriter ribbon oscillating mechanism, and a spacing solenoid ($S_{ST}$) which operates the space bar in the typewriter. When a zero is received in the typewriter prior to a numeral ("1" through "9"), the spacing solenoid $S_{ST}$ energizes, causing the typewriter to space. It will be seen, by reference to Fig. 21, that the circuit to the zero solenoid ($S_{OT}$) is opened by the movable contact 1110 and the fixed contact 1108 of relay $R_Z$, and that the circuit to the spacing solenoid ($S_{ST}$) is completed through the movable contact 1110 and the fixed contact 1109 of relay $R_Z$, therefore, the typewriter spaces instead of printing upon reception of the zero impulse. When the first numeral ("1" through "9") is received, the switch $T_K$ is operated by the ribbon oscillation mechanism. Closure of movable contact 1114 against fixed contact 1113 of switch $T_K$ completes a circuit to relay $R_Z$ which is, in turn, operated and locked in its operated position by its own contacts 1111 and 1107. The outer movable contact of relay $R_Z$ closes against fixed contact 1108, thus completing a circuit to the zero solenoid $S_{OT}$ through conductor 1105 and opening the circuit to the spacing solenoid, normally, via contact 1109 and conductor 1106. Relay $R_Z$ remains operated until the total, or compute, function is completed.

In the typewriter 101 are provided solenoids $S_{AT}$–1042 and $S_{3S}$–1043 (Figs. 12 and 17, respectively), which are fixed relative to the movable carriage of the typewriter, and are energized during the computing cycle.

Solenoid 1042–$S_{AT}$, as shown in Fig. 17, is supported on a fixed bracket 1044 so that its plunger 1045, when extended, will be in the path of movement of a pivotally supported arm 1046 mounted on a bracket 1047 supported on a bar 1048 bolted to a plate 1049 on the carriage of the typewriter. Conventional with the bar 1048 on the typewriter is a tabulating stop plate 1050 having thereon, projections 1051, 1952, 1053, and 1054, the function of which is to serve as definite spaced stops during the passage of the carriage of the typewriter from one end of its run to the other. The arm 1046, pivotally supported at 1055, is normally held raised by means of a spring 1056, one end of which is attached to an apertured extension 1057 extending angularly from the arm 1046. The other end of the spring is attached to a hooked portion 1058 of the bracket 1047. The upper edge of the arm 1046 is provided with two inclined surfaces 1059, 1060 forming a cam to be engaged by the plunger 1045 of the solenoid 1042. Near the free end of the arm 1046 and extending downwardly therefrom, are two spaced finger portions 1061 and 1062, which are arranged to move into spaces on opposite sides of the projection 1052 when the arm 1046 is cammed downwardly by means of the plunger 1045 on the solenoid 1042. It will be seen, therefore, that when the arm 1046 is in its lower position, as shown in Fig. 18, there are two more stops provided on the carriage for engagement, in a well-known manner, with the conventional tabulator stop arm on the typewriter, since the fingers 1061 and 1062 lie against the stop plate 1050 and in parallel spaced relation with the projection 1052.

The solenoid 1043–$S_{3S}$, as shown in Fig. 12, is mounted on a fixed bracket 1063 so that its plunger 1064, when extended beyond the position shown in Fig. 12, will be in the path of movement of a lever 1165 forming part of the mechanism 1166 for rotating the platen of the typewriter, the mechanism 1166 comprising conventional members, such as the spring-pressed pivotally supported limiting lever 1167, and a vertically adjustable lever 1168 supporting a pawl 1169. The assembled lever 1167 and lever 1168 and pawl 1169 are under the control of a manually operable lever 1170 and are cooperable to rotate the platen of the typewriter in definite steps as required. The lever 1165 is attached at two points, 1171 and 1172, to the lever 1170, and is provided with a return spring 1173 to hold the outer end of the lever 1165 normally elevated, the outer end of the lever 1165 being provided with a cam surface 1174. The lever 1170 is provided with a laterally projecting stop 1176 which, upon operation of the lever 1170 toward the left of the position shown in Fig. 12, will move from a recess 1177 formed in the lever 1167 into the path of movement of a lower recess 1178 formed in the lever 1167, thus allowing the lever 1167 to rise under the action of the spring 1175. When pressure is applied to the outer end of the lever 1165 on the cam surface 1174, the lever 1167 and the vertical lever 1168 are allowed to move upwardly, the lever 1167 being moved under the action of a spring 1175 so that the lever 1168 and the pawl 1169 will be raised a sufficient distance that, upon movement downwardly under control of a well-known mechanism, the pawl 1169 will rotate the platen three spaces instead of one. Therefore, when the solenoid 1043 is energized and the plunger 1064 is extended and the cam surface 1174 of the lever system in the mechanism 1166 comes into contact with the plunger 1064 of the solenoid in a return movement of the carriage, the mechanism 1166 will be conditioned for a three-step rotative movement of the platen of the typewriter.

The circuit for energization of the solenoids 1042–$S_{AT}$ and 1043–$S_{3S}$ is controlled by the cam 696–$P_T$ in the cam control unit 104, and may be traced as follows: Line wire $L_1$ (Fig. 19A), conductor 182, conductor 730, movable contact 727, and right-hand fixed contact 729 of switch $P_T$, conductor 788, conductor 1069, and winding of solenoids 1042 and 1043 in parallel, conductor 1070 to point 1071, conductor 726 to line wire $L_2$.

GENERAL DESCRIPTION OF OPERATION AND CIRCUITRY OF THE TOLL BILLER

NOTE.—Reference to Figs. 19 and 19A will aid in understanding the following description.

1. LISTING OF CHARGES

(a) Selection clearing

When preparing a customer bill for telephone services, the operator first typewrites the date and the telephone number in the upper left-hand portion of the bill. The typewriter carriage is then returned and the date of the first "place called" item is entered in the left column of the bill. The typewriter carriage is then tabulated to the "place called" space and the first "place called" item is entered. The carriage is again tabulated to the "A" (15%) or the "B" (25%) column of the bill, whichever is applicable. Tabulation of the carriage from the "place called" space to the "A" amount column transfers the carriage operated switch $T_C$ and switch $T_T$, which is operated by the tabulating mechanism of the typewriter. Transfer of these switches completes a circuit to control relay $R_{S1}$. As can be seen by the circuit diagram, the circuit from the $L_2$ side of the power input to relay $R_{S1}$ is via switches $T_S$, $B_D$, $T_T$ and $T_C$, however, circuit from $L_2$ is completed through the unopened contacts of relay $R_T$ to switch $B_D$. The purpose of the secondary circuit is to provide an $L_2$ source to relay $R_{S1}$ in the event that the "place called" item is extra long and the typewriter is not tabulated until the carriage has reached the "A" amount column. Switch $T_S$ is transferred at this time and the original circuit to $R_{S1}$ would be open. Operation of relay $R_{S1}$ completes a circuit to the #5 solenoid of both the "A" and "B" calculator selection units. Operation of the #5 selection solenoid, in turn, clears the selection gates and prepares the respective "A" and "B" calculator selection units for further selection clearing. Closure of $R_{S1}$ contacts also completes a circuit to control relay $R_{S2}$, which, in turn, operates and completes a circuit to the "A" and "B" calculator selection clearing solenoids $S_{NA}$ and $S_{NB}$. Operation of the selection clearing solenoids restores the selection slides and resets the escape shaft of the respective selection units, to the second order, which is the starting point during normal selection. In effect, the operation, described herein, clears any amount which may have previously entered the selection and prepares the selection units of the "A" and "B" calculators for further selection.

(b) Entering of selection into "A" and "B" calculators

(1) "A" CALCULATOR

If the charge of a particular item listed on the bill is taxable by 15%, the charge is typed in the "A" amount column. Movement of the typewriter carriage into the "A" amount column transfers the carriage operated switch $T_S$, which completes an $L_2$ circuit to the "A" calculator escape shaft solenoids. Typing of the amount in "A" column establishes individual circuits to the $L_1$ side of the escape shaft and selection solenoids via the numeral selection relays, and the amount typed is entered into the "A" calculator selection unit. This is accomplished by the numeral switches ($T_0$ through $T_9$) on the typewriter. Each numeral key on the typewriter has an associated numeral switch which is operated when the character of that particular key is typed. Operation of any numeral switch completes a circuit to a related numeral selection relay ($R_0$ through $R_1$) in the control unit. Operation of a numeral selection relay, in turn, completes circuits to the $L_1$ side of the associated escape shaft and the selection solenoid in the calculator selection unit. Since the $L_2$ common side of the escape shaft solenoids has been completed by $T_S$, and the common side of the selection solenoids have a permanent connection to $L_2$, these solenoids energize and selection is made in the "A" calculator.

(2) "B" CALCULATOR

If the charge of a particular item listed on the bill is taxable by 25%, the carriage is tabulated through "A" column to the "B" amount column. Upon entry into "B" column, the carriage operated switch $T_{AB}$ is restored to its normal position, as shown in the circuit schematic ($T_{AB}$ originally operates shortly after the carriage leaves the left margin of the bill). Transfer of switch $T_{AB}$ opens the circuit to the "A" calculator escape shaft solenoids and establishes a circuit to the common $L_2$ side of the "B" calculator escape shaft solenoids. The charge is typed in the "B" amount column and selection is made in the "B" calculator selection unit. The numeral switches and selection relays operate and the selection procedure is the same as that described for the "A" calculator except that the circuit to the "A" escape shaft solenoids has been opened and the circuit to the "B" escape shaft solenoids has been completed, causing the selection to be made in the "B" instead of the "A" calculator.

(c) Backspacing

If the amount to be typed in "A" or "B" column of the bill, as described above, consists of more than two figures, the backspace key on the typewriter must be depressed prior to making the amount entry. Operation of the backspace key causes the typewriter carriage to backspace and the typewriter backspace mechanism operates the backspace switch $T_B$, shown in Fig. 20. Transfer of the backspace switch $T_B$, in turn, completes a circuit to the backspace solenoid of "A" or "B" calculator, whichever is involved. The backspace solenoid is contained in the escape shaft portion of the calculator selection unit and its operation causes the escape shaft to turn in a direction opposite the normal stepping direction of rotation. The escape shaft rotates in a reverse direction one space each time the backspace key of the typewriter is operated. If the charge to be typed consists of three figures, the operator must backspace once. If the charge consists of four figures, the operator must backspace twice, etc. This sets the escape shaft to the required selection order in accordance with the number of figures contained in a particular charge. The escape shafts of the "A" and "B" calculators originally were positioned to the second order during selection clearing, as described previously.

(d) Selection of zero during spacing

A switch is provided on the spacing mechanism of the typewriter, which operates during spacing in "A" or "B" amount column. The spacing switch $T_{SP}$ (Fig. 20) is in direct connection with the zero selection relay $R_0$, and its operation, while the typewriter is in the "A" or "B" amount column, causes a zero to be selected in the "A" or "B" calculator selection unit, whichever is involved. The zero selection solenoid is mounted on the escape shaft portion of the calculator selection unit, and its operation causes the escape shaft to step, in the normal direction of rotation, one place each time the space bar is operated. It can be seen that the zero solenoid performs exactly the opposite function of the backspace solenoid and if, during the backspace operation described previously, the operator should backspace too many times, the space bar may be operated, which will position the escape shaft to the desired selection order.

(e) Addition on carriage return

After a "place called" item and charge has been entered on the bill, as described previously, the typewriter carriage is returned. Returning of the typewriter carriage operates switch $T_+$, which, in turn, completes a circuit to the calculator add solenoids $S_{+A}$ and $S_{+B}$. This initiates an addition, or plus operation in the "A" and "B" calculators and causes the amount in the selection unit of the "A" or "B" calculator to be added to the amount in the respective "A" or "B" set of accumulator dials. It can be seen that the amount in the accumulator, after the first entry on a bill, would be the original typed amount since the accumulator dials are returned to zero prior to the beginning of each bill. The amount in the accumulator dials after the second entry in the same column would be the first amount plus the second amount, etc. In effect, a running total of the "A" and "B" amount columns is stored in the accumulator dials of the respective "A" and "B" calculators.

(f) Correction

Occasionally in the preparation of bills, the operator may make an error in the amount entered in "A" or "B" column and, consequently, in the calculator. The incorrect amount may be corrected by operation of the correct key $K_-$. Operation of the correct key completes a circuit to, and operates, the calculator subtract solenoids $S_{-A}$ and $S_{-B}$, which, in turn, initiates the subtract operation in the "A" and "B" calculators and the incorrect amount is subtracted from the amount in the accumulator dials. Since the incorrect amount was added to the accumulator dials by the carriage return operation, as described previously, the remaining amount in the accumulator dials is the same as the amount prior to the incorrect entry. It can be seen that correction must be made after the carriage of the typewriter has been returned and prior to entry of the following "place called" item and tabulation. The incorrect amount is marked out on the bill and the operator may continue with the listing of items.

2. COMPUTE CYCLE

After all of the items and charges have been entered on a bill, as described previously, the compute key is depressed. Operation of the compute key $K_C$ starts the program motor of the control unit, which, in turn, operates program switches which control functional elements to automatically compute and typewrite on the bill the total amounts of "A" and "B" columns, the tax amounts of "A" and "B" columns, and the final total. This is accomplished as follows: Initial operation of switch $K_C$ completes a circuit to the program motor which is immediately operated. Program switch $P_T$ then operates and establishes a secondary program motor circuit so that the motor will remain operated until the end of the compute cycle. Transfer of switch $P_T$ also completes a common $L_-$ circuit to the special functional solenoids and control relays to be used during the compute cycle. Program switch $P_P$ operates shortly after the beginning of the cycle and establishes an $L_2$ circuit to the common side of the typewriter printing solenoids. Since solenoids $S_{AT}$, $S_{3S}$, $S_{TAB}$ and control relay $R_T$ have $L_2$ connections at the time $P_T$ is transferred, they are immediately energized. Operation of solenoid $S_{AT}$ conditions the auxiliary tab stop mechanism so that tab stops are provided at the six-place point in the "A" and "B" amount columns of the bill. Operation of solenoid $S_{3S}$ conditions the triple line feed mechanism on the typewriter so that triple line feeds are obtained during the compute cycle. Energization of solenoid $S_{TAB}$ actuates the tabulation key on the typewriter and the typewriter immediately tabulates. Operation of relay $R_T$ opens the auxiliary circuit to switch $B_D$ so that it does not interfere with the tabulation during the compute cycle. The typewriter tabulates through to the "A" amount space at which point the tabulation circuit is broken by the transfer of switch $T_S$. During tabulation, the "A" and "B" calculator selection units are cleared, except that the six-place selection clearers $S_{6A}$ and $S_{6B}$ are operated instead of the normal two-place clearers $S_{NA}$ and $S_{NB}$. This sets the "A" and "B" selection unit escape shafts at the sixth selection order, as described in the aforementioned Patent No. 2,842,310. Switch $P_{MA}$ then operates and energizes the "A" calculator multiplication solenoid $S_{MA}$ and the "A" calculator begins its multiplcation operation. As the "A" calculator carriage starts its right shift, the "A" column total, which has previously been stored in the accumulator dials by selection, is read out and the amount is printed on the bill. This is accomplished through the accumulator dial readout switches, which have previously been positioned by the accumulator dials. As the carriage shifts, $L_1$ is supplied via switch $A_R$, through the carriage readout contact to the selected accumulator dial readout switches, which, in turn, are in direct connection with the numeral selection relays. The selection relays complete circuits to the typewriter numeral key solenoids, which, in turn, operate the numeral keys and the amount is printed on the bill. The amount in the "A" accumulator dials is also read and entered into its own selection unit. Toward the end of the right shift of the calculator carriage, the carriage clearer, which has previously been conditioned by the operation of the carriage clearer solnenoid $S_{CA}$ through the operation of program switch $P_C$, clears the amount in the accumulator dials and all of the dials are restored to "0." The calculator carriage then returns to the left and calculator functions take place, which multiply the amount in the selection unit ("A" column total) by 15% and the resultant amount is registered in the accumulator dials. Immediately after the total has been printed in the "A" total space of the bill, $T_S$ transfers and again completes the tabulation circuit to the typewriter and the carriage is tabulated to the "B" total amount space at which point the tabulation circuit is again opened by the reoperation of switch $T_S$. Program switch $P_{MB}$ then operates and energizes the "B" calculator multiplication solenoid and the "B" multiplication operation is initiated. The "B" multiplication operation is the same as the "A" multiplication, except that the "B" column amount is printed in the "B" total space of the bill and the "B" amount is multiplied by 25% rather than 15%. It can be seen at this point, that the amount now in the "A" calculator selection unit is the "A" column total, the amount in the "A" accumulator is the "A" column tax, the amount in the "B" selection unit is the "B" column total and the amount in the "B" accumulator dials is the "B" column tax. After the total amounts have been printed on the bill, the typewriter carriage automatically returns. No addition takes place on carriage return operations during the computing function as the circuit through $T_+$ to the plus solenoids has been opened by the operation of switch $P_T$. Return of the carriage again transfers switch $T_S$ to its normal position and the circuit to the typewriter tabulation solenoid is re-established. The typewriter then tabulates to the "A" tax space of the bill. No selection clearing takes place during this tabulation of the typewriter since the circuit to the selection clearing solenoids has been opened by the transfer of program switch $P_C$. Program switch $P_{DA}$ is then operated, which completes a circuit to the "A" calculator "Div. Tab" solenoid and the "A" calculator "Div. Tab" operation is started. As the "A" calculator "Div. Tabs," its carriage is moved to the left and the amount in the accumulator dials ("A" tax) is read out and printed in the tax space of the bill. No carriage clear takes place during this movement of the calculator carriage, as program switch $P_C$ has returned to its normal position, therefore, the amount in the accumulator dials remains. At the end of the "A" calculator "Div. Tab" operation, a plus operation, which is an automatic part of the "Div. Tab" function, takes place, adding the amount in the selection unit to the amount in the accumulator dials. Since the selection units were not cleared prior to the "Div. Tab" operation, the amounts previously stored, remain. After the "A" tax has been printed on the bill, the typewriter carriage is tabulated to the "B" tax space, as described previously. Program switch $P_{DB}$ then operates and establishes a circuit to the "B" calculator "Div. Tab" solenoid $S_{DB}$ and the "B" calculator "Div. Tab" operation is initiated. This operation is exactly the same as the "A" calculator "Div. Tab" operation, except that the tax amount is printed in the "B" tax space. It can be seen that, at the completion of the "B" calculator "Div. Tab" operation, the amount stored in the "A" accumulator dials is the "A" column total plus the "A" column tax, the amount stored in the "A" selection unit is the "A" total, the amount stored in the "B" accumulator dials is the "B" total plus the "B" column tax and the amount in the "B" selection unit is the "B" column total. After the tax amounts have been printed, the typewriter carriage again returns and the typewriter is tabulated, as described previously. During tabulation, the "A" calculator selection unit is cleared due to the transfer of switch $P_C$ to its normal position. No selection clearing takes place in the "B" calculator as the individual circuit to the "B" selection clearing solenoid $S_{6B}$ has been opened by the previous transferal of program switch $P_6$. It will be noted, that the tabulation, just described, does not take place immediately after the carriage has been returned. The reason for this is that the tabulation circuit has been opened by calculator switch $B_D$ which is operated by the "Div. Tab" key of "B" calculator. After the typewriter has been tabulated to the "A" amount field, the program switch $P_{DB}$ is operated for a second time and the second "Div. Tab" operation is initiated. The amount in the "B" calculator is read into the "A" calculator selection which has previously been cleared, as described. The amount is not typed on the bill during this "Div. Tab" operation, since the common side of the typewriter numeral key solenoids has been opened by the previous transfer of switch $P_P$ to its normal position. Switch $P_C$ operates during the "B" calculator "Div. Tab" operation and the amount in the accumulator dials is cleared after the readout operation, however, since an automatic plus operation takes place during "Div. Tab," the amount in the "B" selection unit is transferred to the accumulator dials. Shortly after the "B" readout, program switch $P_+$ is operated, which, in turn, energizes the plus solenoids $S_{+A}$ and $S_{+B}$ of the calculators. This particular plus operation does not take place in the "B" calculator as the plus key is locked mechanically by the "B" calculator "Div. Tab" key which is still operated. The "A" plus solenoid operates, however, and the amount which has just been read into the "A" selection unit from "B" calculator is added to the accumulator dials. The final total amount space of the bill is located beneath the "B" column of the bill, therefore, the typewriter must be tabulated through the "A" amount field since there is no printing in this space. This is accomplished by the operation of switch $P_X$ which establishes an auxiliary circuit to the tabulation solenoid $S_{TAB}$ of the typewriter. After the typewriter has been tabulated to the final total space, program switch $P_{DA}$ is again operated and a second "A" calculator "Div. Tab" operation is initiated. The amount in the "A" accumulator dials is read out and printed in the final total space of the bill. Switch $P_P$ has again operated, at this time, completing a circuit to the typewriter numeral key solenoids. Switch $P_C$ is in its operated position during this "Div. Tab" operation and the amount in the "A" calculator accumulator dials is cleared. At the end of the "Div. Tab" operation, the amount in the "A" selection is added to the accumulator dials. It can be seen that after the final "Div. Tab" operation, the amount in the "A" calculator accumulator dials is the "B" column total plus the "B" column tax, the amount in the "A" calculator selection unit is the "B" column total plus the "B" column tax, the amount in the "A" calculator accumulator dials is the "B" column total and the amount in the "B" calculator selection unit is the "B" column total. After the final total has been printed on the bill, the typewriter carriage returns, however, no further tabulation takes place as the tabulation circuit is opened by the transfer of switch $P_Y$. The program switch $P_-$ is then operated. Operation of switch $P_-$ completes a circuit to the "A" and "B" calculator subtract solenoids $S_{-A}$ and $S_{-B}$. The subtract operation takes place in both calculators and the amount in their respective selection units is subtracted from the amounts in their respective accumulator dials. Since the amounts in the selection unit and accumualtor dials of each calculator is equal, the resultant amount left in the accumulator dials is "0." Switch $B_T$ is then restored to its normal position. Transfer of switch $P_T$ to its normal position opens the motor circuit and restores all circuits to their normal conditions. This completes the compute cycle. The total time required for the sequence of operations just described, is 15 seconds.

3. TOTAL CYCLE (a) Sub-total (without calculator clearing)

At any time, during the listing of items and charges on a bill, a total of the charges to that point can be obtained. To accomplish this, the total key $K_T$ is depressed. Operation of the total key completes a circuit to relay $R_Q$. Relay $R_Q$, in turn, operates and establishes an $L_1$ common line to the functional solenoids and relays to be used during the total cycle. Relay $R_Q$ is locked closed by way of its own contacts and the unoperated contacts of carriage return switch $T_H$. The common $L_1$ line to the functional solenoids also supplies the auxiliary circuit to the program motor 680 described in the compute cycle. Since the operation of the program motor is not required during the total cycle, its $L_2$ circuit is opened by the operated contacts of relay $R_Q$. Typewriter solenoids $S_{AT}$, $S_{3S}$, and $S_{TAB}$, and relays $R_T$ are immediately operated upon closure of the contacts of $R_Q$ and conditions are established similar to those at the beginning of the compute cycle. The typewriter is tabulated to the "A" amount column of the bill. During tabulation, the selection unit of both calculators is cleared, as described in the Patent No. 2,842,310. Tabulation of the typewriter to the "A" amount column operates switch $T_S$ which opens the tabulate circuit. Due to circuit conditions established by the energization of relay $R_Q$, the circuit to the "Div. Tab" solenoid $S_{DA}$ is also completed by the transfer of switch $T_S$. The "A" calculator "Div. Tab" operation is initiated and the amount in the accumulator dials is read into the typewriter whereby it is printed in the "A" amount column. An auxiliary circuit to the common side of the typewriter numeral solenoids is also established by relay $R_Q$ contacts. Since no circuit to the calculator carriage clearing solenoids has been established, the calculators do not clear during "Div. Tab" and the amounts remain in the accumulator dials. Although the selection of both calculators has been cleared, the $L_2$ side of the escape shaft solenoids has been opened preventing any selection from taking place during readout. After the "A" column total has been printed, switch $T_S$ operates momentarily and supplies an intercolumn tabulation pulse tabulating the typewriter carriage to the "B" column. Transfer of switch $T_{AB}$ then establishes a circuit to the "B" calculator "Div. Tab" solenoid $S_{DB}$. This circuit is also a result of previous circuit conditioning by the operation of relay $R_Q$. The "B" calculator "Div. Tab" operation is initiated and the "B" column total is printed. This "Div. Tab" operation is exactly the same as that previously described for "A" calculator. After the "B" total has been read and printed in "B" column, the carriage is returned which operates switch $T_H$, which, in turn, opens the circuit to relay $R_Q$. Release of relay $R_Q$ restores the special circuit conditions, which were required for the subtotal cycle, to normal. This completes the subtotal cycle. Although a plus operation takes place during the "Div. Tab" operation of "A" and "B" calculators, the selection units were cleared previously, therefore, the amount in the accumulator dials remains the same. After the subtotal cycle, the operator may then continue with the additional items and charges of the bill.

(b) Final Total (with calculator clearance)

If, at any time during the preparation of bills, a final total is required without the normal computer operation, this can be obtained by first operating the "Non Tax" switch N and then restoring the switch to its normal position. Operation of the "Non Tax" switch energizes relay $R_A$, which, in turn operates relay $R_D$. Restoring of the "Non Tax" switch to normal provides a circuit through the contacts of relay $R_D$ to the carriage clearing solenoids $S_{CA}$ and $S_{CB}$. The total key is then depressed. This initiates the total cycle, which is the same as the subtotal cycle described previously, except that a circuit has been established to the carriage clearing solenoids so that the carriages are cleared during the "Div. Tab" operations of the respective calculators. It will be noted that relay $R_A$ opens upon operation of relays $R_Q$ and $R_T$ at the beginning of the final total, however, relay $R_D$ is locked closed by its own contacts. The "A" and "B" column totals are printed and the typewriter carriage is returned, which opens the special circuits which have been established. The operator may then begin a new bill, or listing of items.

4. MIXED BILL

(a) Special non tax compute cycle

Occasionally, when preparing bills, a particular bill for services will consist of both taxable and nontaxable items. Such a bill is classified as a mixed bill. When typing and computing a mixed bill, the operator must list all of the taxable items and charges at the beginning of the bill. After these items have been listed, the typewriter platen is then turned down so that the typing guide is in line with the "A" and "B" column total spaces. The "Non Tax" switch N is then operated. Operation of the "Non Tax" switch completes a circuit to relay $R_A$, which, in turn, energizes relay $R_D$ and completes a circuit to the yellow lamp 906 on the typewriter. The purpose of the yellow lamp is to indicate that a "Non Tax" condition exists. The compute key $K_C$ is then operated. This initiates a special compute cycle which automatically computes and prints on the bill, the total of "A" column, the tax amounts of both "A" and "B" columns, and establishes the circuits necessary for obtaining the "B" column total and the final total, to be described later. The special compute cycle is much the same as the normal compute cycle in that the program switches are operated in the same sequence, however, due to the prior operation of the "Non Tax" switch, circuits are established which change the function and operation of certain elements to obtain the desired results. The operation of the compute key $K_C$ starts the program motor 680, which, in turn, through the cam 696, operates switch $P_T$ and sets up the same conditions that exist at the beginning of a normal compute, except that the "Non Tax" switch is now operated and relay $R_D$ is energized. It will be noted that relay $R_A$ releases, by the opening of the relay $R_T$ contacts at the beginning of the special compute cycle, however, relay $R_D$ remains operated by its own contacts. The typewriter tabulates at the beginning of the compute cycle and the selection units of both calculators are cleared. Program switches $P_{MA}$ and $P_{MB}$ are then operated, initiating the multiplication operation of the respective calculators "A" and "B". The "A" calculator reads the "A" column total which is entered into its own selection unit and the typewriter where it is printed in the "A" total space of the bill. The "A" calculator carriage is cleared and the total, now in the selection unit, is multiplied by 15% and the resultant amount is entered into the accumulator dials. Calculator "B" reads the "B" column total into its own selection, however, during the special compute cycle, the "B" column total is not printed on the bill. The $L_2$ circuit to the typewriter numeral solenoids is opened by the operated position of the "Non Tax" switch, and the operation of program switch $P_{MB}$. The "B" calculator carriage is cleared during the multiplication operation and the "B" column total, which is in the selection, is multiplied by 25% and the resultant amount is entered into the accumulator dials. Since the "B" column total is not printed, extra tabulation operations are required to tabulate the typewriter carriage through the "B" total space. The extra tabulation circuit is established by the operated contacts of the "Non Tax" switch N and the operation of switch $P_Y$, which is operated at this point in the programming. The carriage is returned after tabulation through "B" column and the initial tabulation circuit re-established. The typewriter then tabulates to the "A" column tax space. No selection clearing takes place during the tabulation due to the operated position of switch $P_C$. The "Div. Tab" operation of the "A" and "B" calculators is then initiated by the closing of their respective program switches $P_{DA}$ and $P_{DB}$. The "A" and "B" tax amounts are read and printed in the "A" and "B" tax spaces, as during normal compute. The carriages are not cleared during the "Div. Tab" operations of the respective calculators since switch $P_C$ has returned to its normal position. The totals, which have been entered into the selection units during the multiplication operation, are added to the tax amounts by the "Div. Tab" operations. After the tax amounts have been printed, the typewriter carriage is returned. There is a short delay in tabulation due to switch $B_D$, which does not close until after the "B" calculator "Div. Tab" operation has been completed. After switch $B_D$ closes, the typewriter is again tabulated to the "A" amount field. Due to the return of program switch $P_C$ to its normal position, the "A" calculator selection unit is cleared during tabulation, however, the "B" calculator selection is not cleared due to the previous operation of switch $P_6$, which transfers shortly after the programming has begun. Transferal of switch $P_6$ opens the individual circuit to the "B" selection clearing solenoid $S_{6B}$. After tabulation, the "B" calculator "Div. Tab" operation is again initiated by the second operation of switch $P_{DB}$. The "B" total and tax amount, now in the "B" accumulator, is read into the "A" calculator selection unit but is not printed on the bill, as program switch $P_P$ has opened the common $L_2$ circuit to the typewriter numeral solenoids. The "B" calculator carriage is cleared after the readout due to the reoperation of switch $P_C$, which re-establishes the circuit to the selection clearing solenoids $S_{CA}$ and $S_{CB}$. Program switch $P_+$ then operates and closes a circuit to the "A" calculator "Plus" solenoid, which initiates the plus operation and adds the amount just read into the "A" selection to the amount in the accumulator dials. The amount in the "A" calculator accumulator is now the total of the "A" and "B" columns and the tax of "A" and "B" columns. $P_+$ also energizes the "B" calculator "Plus" solenoid $S_{+B}$, however, the "B" calculator "Plus" key is locked mechanically by the "B" calculator "Div. Tab" operation which is not complete at that point. At the end of the "B" calculator "Div. Tab" operation, the amount in the "B" selection is automatically added to the accumulator dials. Since the accumulator dials were previously cleared, the "B" column total is in both the selection and the accumulator of "B" calculator after the "Div. Tab" operation. Calculator "A" does not "Div. Tab" a second time during the special compute. The circuit to the "A" calculator "Div. Tab" solenoid is opened by the operated contacts of the "Non Tax" switch N. The first "A" calculator "Div. Tab" operation of the special compute cycle is initiated by a circuit to the "Div. Tab" solenoid via switch $P_C$ which is in its unoperated position at that time, however, switch $P_C$ is operated during this portion of programming. Since calculator "A" does not "Div. Tab" a second time, and no final total is printed, the additional tabulation circuit through switch $P_Y$ is again established by the reoperation of switch $P_Y$ and the operated position of the "Non Tax" switch N. The typewriter carriage is tabulated through the final total space and the carriage is returned. The additional tabulation circuit, just described, stems from the operated contacts of switch $T_S$, therefore, it is not effective after the carriage has returned since $T_S$ returns to its normal position during the carriage return operation. The normal tabulation circuit, via the normally closed contacts of switch $T_S$, is opened by switch $P_Y$, which remains operated until the end of the compute cycle, therefore, no further typewriter tabulation takes place. The program switch $P_-$ is operated toward the end of the compute cycle, however, the circuit to the subtract solenoids of the calculators $S_{-A}$ and $S_{-B}$ has been opened by the operation of the "Non Tax" switch N and a new circuit established to relay $R_C$ which then operates and is locked operated by its own contacts. Switch $P_T$ is then transferred to its normal position, opening the circuit to the motor and completing the special compute cycle. Since there is no second "Div. Tab" operation during the special compute cycle, and since no subtraction takes place at the end of the compute cycle, it can be seen that the amount in the "A" calculator, after the special compute cycle, is the "A" and "B" column totals plus the "A" and "B" column tax and the amount in the "B" calculator is the "B" column total only. It will be noted that relays $R_C$ and $R_D$ remain operated after the special compute cycle and the relay $R_A$ is again operated by the release of relay $R_T$ and the operated contacts of the "Non Tax" switch.

(b) *Listing of "Non Tax" charges*

Upon completion of the special compute cycle, the typewriter platen is manually turned back to the portion of the bill just below the taxable items and the "Non Tax" switch N is left in its operated position. The "Non Tax" items and charges are then listed in accordance with normal procedure, except that the charges for all "Non Tax" items are listed in the "B" column of the bill. Due to the previous operation of relay $R_C$, a special circuit is established to the escape shaft solenoids of the "A" calculator selection unit so that all charges listed in "B" column enter the selection unit of the "A" calculator as well as the "B" calculator. The special circuit to the "A" calculator escape shaft solenoids is via the operated right-hand contacts 752 and 753 of switch $T_S$, the unoperated left-hand contacts 888 and 928 of switch $T_{AB}$, the unoperated left-hand contacts 947 and 946 of relay $R_Q$, the operated contacts 940 and 941 of relay $R_C$ and to the common side of the escape shaft solenoids.

(c) *"B" column total*

After all of the "Non Tax" items have been entered, as described above, the typewriter platen is turned so that the typewriter printing guide is in line with the "A" and "B" column total spaces. The total key $K_T$ is then depressed. Operation of the total key energizes relay $R_Q$, which, in turn, establishes the standard circuit conditions required for the total cycle (operation of solenoids $S_{AT}$, $S_{3S}$, $S_{TAB}$ and relay $R_T$). The typewriter automatically tabulates, as during the normal total cycle, except that due to the special circuit conditions which have been established, the typewriter tabulates on through the "A" column total space (the "A" column total was printed during the special compute cycle). The selection units of both calculators are cleared during tabulation as during the normal total cycle. The special circuit for tabulation through the "A" amount field is via the operated right-hand contacts 752 and 753 of switch $T_S$, the operated right-hand contacts 887 and 888 of switch $T_{AB}$, the operated right-hand contacts 948 and 884 of relay $R_C$, through switch $B_D$, $T_T$, $P_Y$ and by way of conductor 802 to the typewriter tabulation solenoid $S_{TAB}$. Upon arrival of the typewriter carriage to the "B" total space, the "B" calculator "Div. Tab" operation is initiated and the "B" column total is read into the typewriter and printed in the "B" total space (it will be noted that the circuit to the "A" calculator "Div. Tab" solenoid used during normal total has been opened by the operated contacts of relay $R_C$). After the "B" column total has been printed, the carriage is returned, operating switch $T_H$ which, in turn, releases relay $R_Q$ and relay $R_D$. Return of $R_Q$ to its unoperated position opens the common $L_1$ circuit to the functional solenoids and relay $R_T$. Releasing of relay $R_T$ again establishes the circuit to relay $R_A$ (this circuit was opened at the beginning of the total cycle by operation of relay $R_T$). Relay $R_A$ operates and re-establishes a circuit to relay $R_D$ which is again energized and locked operated by its own contacts. This completes the "B" column total operation.

(d) *Final mixed bill total*

Upon completion of the subtotal operation, the typewriter platen is manually turned so that the typing guide is in line with the final total space. The "Non Tax" switch N is then returned to its normal position. Restoral of the N switch to normal releases relay $R_A$ and completes a circuit to relay $R_B$. The circuit to $R_B$ was partially completed by the operation of relay $R_C$ and relay $R_B$ is operated when the "Non Tax switch is returned to normal. The left-hand closed contacts 918 and 892 of the N switch also completes a circuit to the carriage clearing solenoids $S_{CA}$ and $S_{CB}$ through the right-hand closed contacts 1092 and 1093 of relay $R_D$. The carriage clearing solenoids operate and condition the carriages of "A" and "B" calculators so that they are cleared during the "Div. Tab" operation. The total switch $K_T$ is then depressed. Operation of the total key energizes relay $R_Q$, which, in turn, operates and establishes those conditions necessary for total operations, as described previously. The typewriter carriage is automatically tabulated through the "A" amount field to the final total space of the bill. The special circuit for tabulation through the "A" amount field is the same as described in the "B" column total operation. The "Div. Tab" operation is then initiated in both calculators, simultaneously. The circuit for the simultaneous operation of the "Div. Tab" solenoids is via the operated righ-hand contacts 752 and 753 of switch $T_S$, the unoperated left-hand contacts 928 and 888 of switch $T_{AB}$, the operated right-hand contacts 925 and 947 of relay $R_Q$ and to the operated contacts 572 and 573 of relay $R_B$ where the $L_2$ lines to the respective "A" and "B" calculator "Div. Tab" solenoids $S_{DA}$ and $S_{DB}$ are paralleled. Although the "Div. Tab" operation takes place in both calculators simultaneously, only the "A" calculator reads out into the typewriter as the common line to the "B" calculator readout contacts are opened by the operation of relay $R_B$. The locking circuit to relay $R_C$ is via the unoperated left-hand contacts 937 and 936 (Fig. 19) of switch $A_R$ which operates during the "A" calculator readout, therefore, relay $R_C$ is released at the beginning of the "A" calculator readout. The accumulator dials of both calculators are cleared and restored to zero during the simultaneous "Div. Tab" operations due to the previous energizing of their respective carriage clearing solenoids. It will be noted that the only reason for the "Div. Tab" operation of the "B" calculator at this time is to clear the accumulator dials. This was not accomplished during the previous "B" column total operation due to the operated position of the "Non Tax" switch N. As pointed out previously, the circuit to the carriage clearing solenoids stems from the unoperated left-hand contacts 892 and 918 of the "Non Tax" switch N. After the final total has been read from the "A" calculator and printed in the final total space of the bill, the carriage of the typewriter is returned and operates switch $T_H$ to open its contacts. Operation of switch $T_H$ releases relays $R_Q$, $R_B$ and $R_D$. Relay $R_Q$, in turn, releases relay $R_T$, solenoids $S_{AT}$, $S_{3S}$, and $S_{TAB}$ to restore all circuits to their normal condition. This completes the operations necessary for preparing and computing a mixed bill. Since the carriages of the calculators are clear (accumulator dials restored to zero) they are prepared to receive and compute the next bill.

5. "Non Tax" Bill

(a) Listing of charges

In certain cases, during the preparation of bills for services, all of the items contained in the bill will be non-taxable. When this occurs, the "Non Tax" switch N is operated prior to the listing of the items and charges. Operation of the "Non Tax" switch completes a circuit to relay $R_A$. Relay $R_A$ then energizes and completes a circuit to the "Non Tax" indicating lamp 906 and to relay $R_D$. The indicating lamp lights and relay $R_D$ operates and is locked in an operated position by its own contacts. Operation of relay $R_A$ also opens the circuit to the "A" calculator escape shaft solenoids and completes a secondary circuit to the "B" calculator escape shaft solenoids so that entries made in the "A" amount column will enter calculator "B" instead of calculator "A." The items and charges are then listed on the bill in accordance with normal procedure, however, all charges listed in both "A" and "B" amount columns enter the "B" calculator selection only. The secondary circuit to the "B" calculator escape shaft solenoids is via the operated right-hand contacts 752 and 753 of switch $T_S$, the operated right-hand contacts 887 and 888 of switch $T_{AB}$, the unoperated left-hand contacts 883 and 884 (Fig. 19) of relay $R_C$, the operated right-hand contacts 914 and 880 of relay $R_A$, and to the escape shaft solenoids of the "B" calculator by way of conductor 916.

(b) "Non Tax" total

After all of the "Non Tax" items have been listed, as described above, the typewriter platen is turned so that the printing guide is in line with the final total space of the bill. The "Non Tax" switch N is then returned to its normal position. Restoral of the "Non Tax" switch to its normal position completes a circuit through the right-hand contacts of relay $R_D$ to the carriage clearing solenoids $S_{CA}$ and $S_{CB}$. Relay $R_A$ is released, however, relay $R_D$ remains operated via its own contacts. The total key $K_T$ is then operated. Operation of the total key initiates a total cycle which is exactly the same as the final total cycle described previously. Since none of the charge amounts have entered the "A" calculator, the typewriter platen is spaced through the "A" amount field during the "A" calculator "Div. Tab" operation. The final total is then printed in the final total space by the "B" calculator "Div. Tab" and readout operation. The carriage is returned, operating switch $T_H$ and restoring all circuits to their normal condition, as described previously. This completes the operations necessary for computing a "Non Tax" bill. Since the accumulator dials in both calculators are clear, the machine is prepared to receive the next bill.

6. International Telegrams

Occasionally when preparing bills for services, items and charges for international telegrams must be listed. Since the occurrence of such items is very infrequent, no provision was made in this invention for computing the tax of such items and charges. These items are handled in the same manner as the "Non Tax" items of a mixed bill and are listed along with the "Non Tax" items. The tax for these items, which is 10%, must then be computed by some external means and the resultant amount listed below the "B" column total operation and prior to the final total operation of the mixed bill. The total and tax for these items will then be automatically added to the final mixed bill total.

I claim:

1. In apparatus comprising a frame, a reciprocating carriage mounted in said frame, a rotatable platen, means to operate said carriage, means to rotate said platen and latch means to control the extent of rotation of said platen in combination, a lever extending from said latch means and from said carriage, a fixed support mounted on said frame, a solenoid mounted on said fixed support, a plunger operable by said solenoid to extend into the path of movement of said lever to operate said lever to a required position, and means to operate said solenoid.

2. In apparatus comprising a reciprocating carriage, a rotatable platen mounted in said carriage and rotatable in single step movements and a plurality of step movements as required, pawl means to rotate said platen and a latch means to control the extent of movements of said pawl means for a single step and a plurality of step movements in combination, a cam surfaced lever extending from said latch means, a fixed support, an electrically operated device mounted on said fixed support, means to operate said electrically operated device and a movable member in said electrically operated device operable to move into the path of movement of said cam surfaced lever to operate said lever to set said latch means for a required step movement of said platen.

3. In a machine comprising a rotatable platen, a lever and pawl system operable to rotate the platen in predetermined step-like movements and an adjustment lever in the lever and pawl system, a carriage supporting the platen and lever and pawl system, means to move said carriage, a cam surfaced lever extending from the adjustment lever, a fixed support, an electromagnetic device supported on said fixed support, means to energize said electro magnetic device, and a movable part in said electromagnetic device operable to extend into the path of movement of said cam surfaced lever to operate the adjustment lever.

4. In a machine comprising a rotatable platen, a lever and pawl system operable to rotate the platen in step-like movements and an adjustment latch lever in the lever and pawl system, a reciprocating carriage supporting the platen and lever and pawl system, means to move said carriage means to operate the lever and pawl system, a cam surfaced lever extending from the adjustment lever, a fixed support, a solenoid mounted on said fixed support, means to operate said solenoid, and a plunger in said solenoid operable to extend into the path of movement of the latch lever and operate the latch lever during reciprocating movement of said carriage.

5. In a typewriter comprising a reciprocating carriage, a rotatable platen, a pawl to rotate said platen, an adjustably supported member supporting said pawl and operate to move said pawl and a releasable latch mechanism operable to control the extent of movement of said pawl in combination, a lever supported on said releasable latch and extending therefrom and traveling with said carriage, a remotely controlled member operable to be moved into the path of movement of said lever to operate said lever, and means to control the movement of said remotely controlled member.

6. In a typewriter comprising a reciprocating carriage, a rotatable platen, a pawl to rotate said platen, a movable member carrying said pawl and operable to move said pawl to move said platen, said movable member being operable to be set in an adjusted position, and a releasable latch operable to control said movable member in combination, a lever supported on said releasable latch and extending from said reciprocating carriage, a fixed support, a solenoid supported on said fixed support, a movable plunger in said solenoid operable to be moved into the path of movement of said lever to operate said latch, and means to operate said solenoid.

7. In a typewriter comprising a reciprocating carriage, a rotatable platen supported in said carriage, a pawl to rotate said platen in step-by-step movements, a movable support for said pawl operable to be set at different positions for single step and plural step movement of said platen, means to move said movable support and a latch means to latch said movable support in one position for a one step movement of said platen and in another position for a three step movement of said platen in combination, a lever extending from and controlling the setting of said latch means, a cam surface on said lever, a solenoid fixedly supported relative to said carriage, a plunger in said solenoid operable upon energization of said solenoid to extend into the path of movement of said cam surface to cam said lever to a required predetermined position, and means to energize said solenoid.

References Cited in the file of this patent

UNITED STATES PATENTS

| | | |
|---|---|---|
| 972,832 | Du Belle | Oct. 18, 1910 |
| 1,608,847 | Fowler | Nov. 30, 1926 |
| 1,985,826 | Hart | Dec. 25, 1934 |
| 2,027,565 | Stickney | Jan. 14, 1936 |